(12) United States Patent
Tomoeda

(10) Patent No.: US 10,013,571 B2
(45) Date of Patent: *Jul. 3, 2018

(54) INFORMATION MANAGEMENT SYSTEM AND INFORMATION MANAGEMENT METHOD

(71) Applicant: Mizuho Information & Research Institute, Inc., Tokyo (JP)

(72) Inventor: Atsushi Tomoeda, Tokyo (JP)

(73) Assignee: Mizuho Information & Research Institute, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,839

(22) Filed: Mar. 1, 2017

(65) Prior Publication Data

US 2017/0243024 A1 Aug. 24, 2017

Related U.S. Application Data

(63) Continuation of application No. 14/237,146, filed as application No. PCT/JP2012/070111 on Aug. 7, 2012, now Pat. No. 9,628,496.

(30) Foreign Application Priority Data

Aug. 10, 2011 (JP) .................................. 2011-175350

(51) Int. Cl.
    *G06F 21/62* (2013.01)
    *H04L 29/06* (2006.01)
(52) U.S. Cl.
    CPC ........ *G06F 21/6218* (2013.01); *H04L 63/107* (2013.01); *H04L 63/108* (2013.01);
    (Continued)

(58) Field of Classification Search
    CPC ......... G06F 21/6218; G06F 2221/2137; G06F 2221/2111; H04L 63/107; H04L 63/108
    See application file for complete search history.

(56) References Cited

U.S. PATENT DOCUMENTS

| 5,787,177 A | 7/1998 | Leppek |
| 8,499,152 B1 * | 7/2013 | Chen ..................... H04L 63/102 |
| | | 713/155 |

(Continued)

FOREIGN PATENT DOCUMENTS

| CN | 101382976 A | 3/2009 |
| EP | 1220510 A2 | 7/2002 |

(Continued)

OTHER PUBLICATIONS

Sailer et al., "Attestation-based Policy Enforcement for Remote Access", Oct. 25-29, 2004, ACM, pp. 308.*

(Continued)

*Primary Examiner* — Matthew Smithers
(74) *Attorney, Agent, or Firm* — Kilpatrick Townsend & Stockton

(57) ABSTRACT

In the present invention, a control section of a CRM server performs editing processing for TPO (the time, the place, and the occasion) requirements. Next, a control section of a TPO server registers the TPO requirements in order to convert the same to TPO definitions. Then, the control section performs setting processing for the TPO definitions. A portable terminal identifies the current location and the current time. Then, a control section verifies TPO definition state transitioning. If transitioning of the TPO definition state is detected, the control section performs TPO definition state transition notification processing. The control section of the portable terminal performs individual control processing on the basis of the TPO definitions.

13 Claims, 12 Drawing Sheets

(52) U.S. Cl.
CPC ............... *G06F 2221/2111* (2013.01); *G06F 2221/2137* (2013.01)

(56) References Cited

U.S. PATENT DOCUMENTS

| | | | |
|---|---|---|---|
| 8,683,547 B2* | 3/2014 | Apparao | G06Q 10/06 705/304 |
| 9,390,263 B2* | 7/2016 | Thomas | G06F 21/56 |
| 9,628,496 B2* | 4/2017 | Tomoeda | G06F 21/6218 |
| 2002/0124067 A1* | 9/2002 | Parupudi | G06F 21/62 709/223 |
| 2005/0055578 A1* | 3/2005 | Wright | G06F 21/32 726/4 |
| 2005/0125673 A1* | 6/2005 | Cheng | G06F 21/32 713/182 |
| 2006/0069605 A1 | 3/2006 | Hatoun | |
| 2006/0095389 A1 | 5/2006 | Hirota et al. | |
| 2006/0224742 A1 | 10/2006 | Shahbazi | |
| 2007/0100765 A1 | 5/2007 | Naganuma | |
| 2007/0220061 A1* | 9/2007 | Tirosh | G06F 21/556 |
| 2009/0064345 A1* | 3/2009 | Honda | G06F 21/6218 726/28 |
| 2010/0048167 A1 | 2/2010 | Chow et al. | |
| 2010/0162273 A1* | 6/2010 | Shoji | G06F 11/3476 719/323 |
| 2010/0175116 A1 | 7/2010 | Gum | |
| 2011/0099248 A1* | 4/2011 | Uchida | G06F 21/57 709/218 |
| 2011/0099602 A1 | 4/2011 | Apparao | |
| 2011/0231378 A1* | 9/2011 | Seo | G06F 21/6281 707/694 |
| 2011/0246753 A1 | 10/2011 | Thomas | |
| 2011/0252464 A1* | 10/2011 | Sanjeev | H04L 63/107 726/7 |
| 2011/0321153 A1* | 12/2011 | Stoev | G06F 21/6245 726/16 |
| 2013/0104190 A1* | 4/2013 | Simske | G06F 21/60 726/1 |
| 2013/0159704 A1* | 6/2013 | Chandrasekaran | G06F 21/57 713/156 |

FOREIGN PATENT DOCUMENTS

| | | |
|---|---|---|
| EP | 1653386 A2 | 5/2006 |
| JP | 2003-140968 A | 5/2003 |
| JP | 2005-234729 A | 9/2005 |
| JP | 2006-53824 A | 2/2006 |
| JP | 2006-99728 A | 4/2006 |
| JP | 2006-115433 A | 4/2006 |
| JP | 2006-352561 A | 12/2006 |
| JP | 2007-109182 A | 4/2007 |
| JP | 2007-233635 A | 9/2007 |
| JP | 2008015669 A | 1/2008 |
| JP | 2010072715 A | 4/2010 |

OTHER PUBLICATIONS

Alawneh et al., "Preventing Information Leakage between Collaborating Organisations", 2008, Int. Conf. on Electronic Commerce (ICEC), pp. 1-10.*

Arai et al., "A Proposal for an Effective Information Flow Control Model for Sharing and Protecting Sensitive Information", 2009, Conferences in Research and Practice in Information Technology (CRPIT), vol. 98, pp. 89-98.*

English translation of Office Action corresponding to Chinese Patent Application 201280049521.5, dated Nov. 20, 2015.

English translation of International Preliminary Report on Patentability from corresponding PCT Application No. PCT/JP2012/070111, dated Feb. 111, 2014, 6 pages.

Search Report related to corresponding European Patent Application No. 12821434.3/2743859, dated Nov. 25, 2014, 6 pages.

English translation of Office Action dated Mar. 22, 2016 corresponding to the related Japanese Patent Application 2014-183577.

Office Action in connection with corresponding European patent application 12821434.3, dated Jan. 31, 2018, five pages.

* cited by examiner

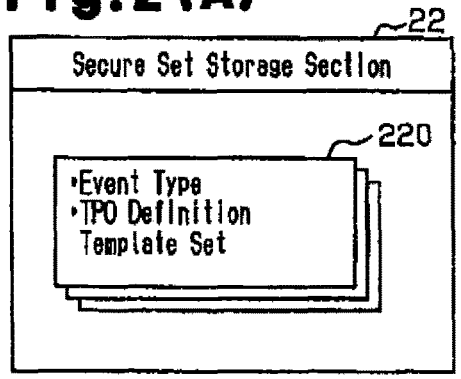
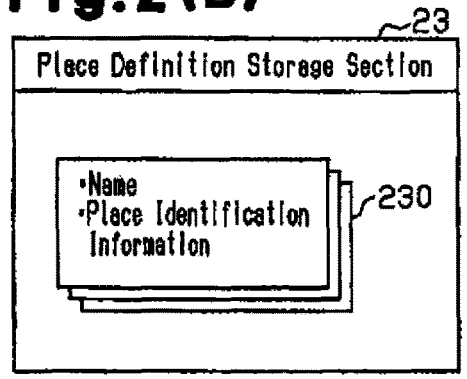
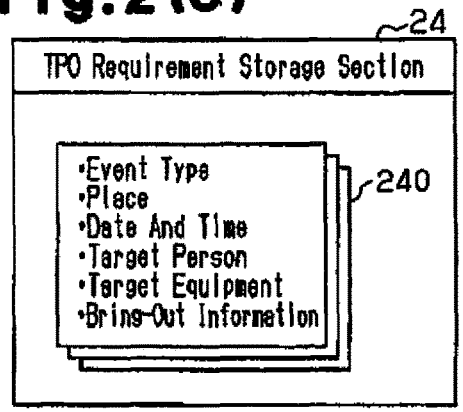
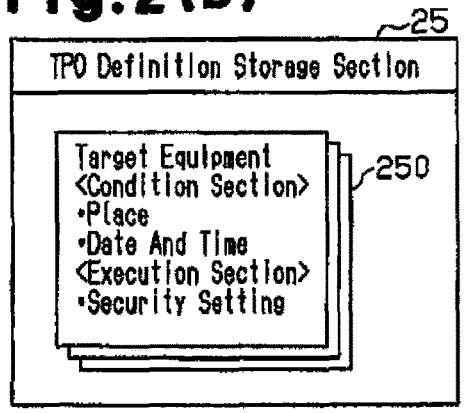
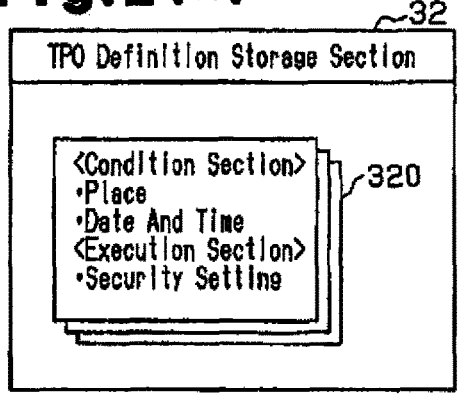

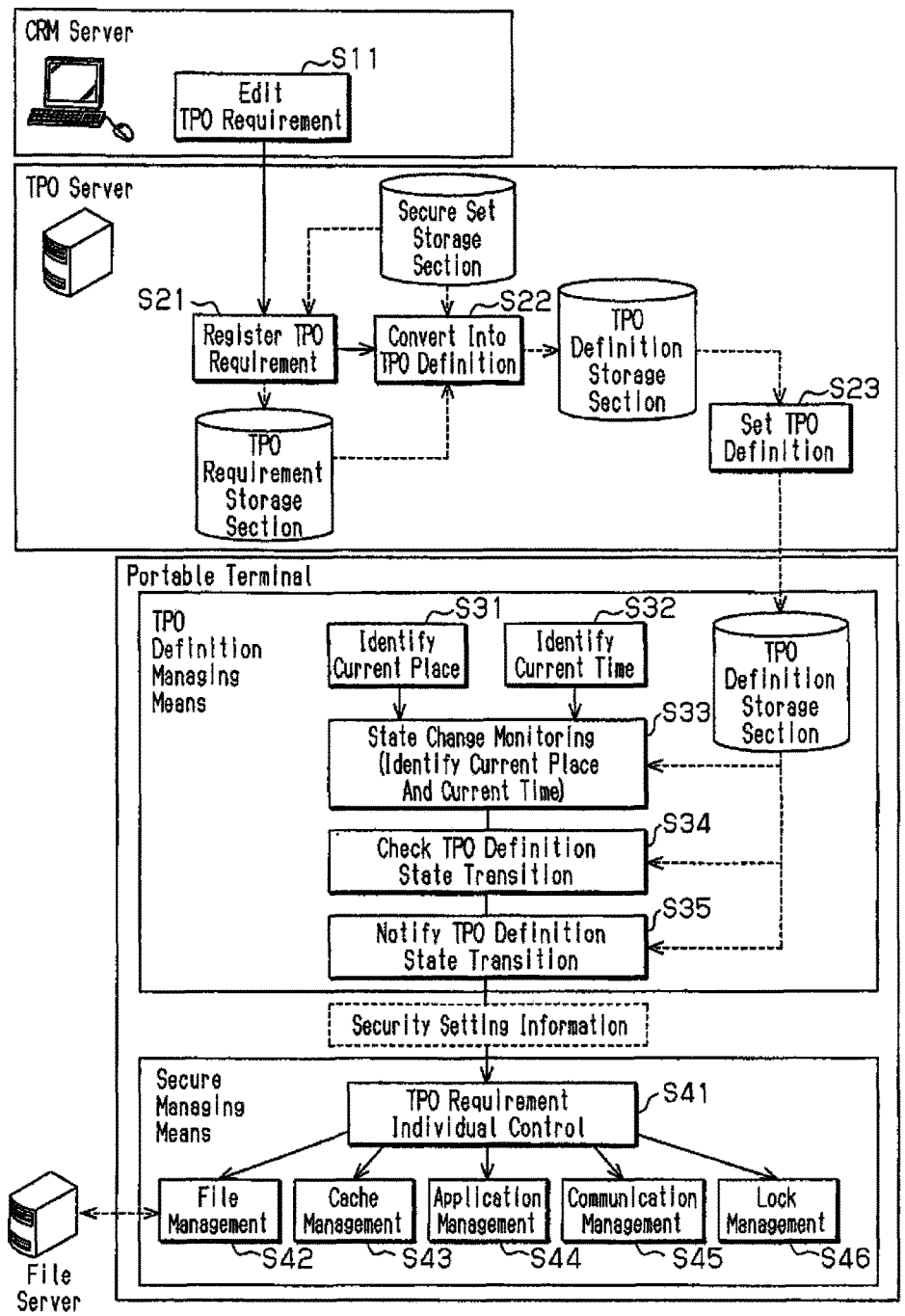

Fig. 4(A) Event Type "Default"

| State | | File Server | | | Cache | | | Application | Communication | Lock |
|---|---|---|---|---|---|---|---|---|---|---|
| | | Secret | General | Exceptional | Secret | General | Exceptional | | | |
| In-House | In-House LAN Connection | sync | sync | sync | ○ | ○ | ○ | All Applications Available | Default | 15 Minutes |
| | In-House LAN Disconnection | × | × | × | ○ | ○ | ○ | Only Web In Communication | FTP:X | 5 Minutes |
| Outside | Not Permitted To Be Brought Out | × | × | × | × | × | × | Tracking Software Activation | Same As On The Left | 0 Minutes |
| | Permitted To Be Brought Out | × | × | × | × | × | × | web.mail&CRM@VPN | FTP:X | 5 Minutes |

Fig. 4(B) Event Type "Meeting"

| State | | File Server | | | Cache | | | Application | Communication | Lock |
|---|---|---|---|---|---|---|---|---|---|---|
| | | Secret | General | Exceptional | Secret | General | Exceptional | | | |
| In-House | Department The User Belongs To | Read Changed Push | — | — | Approved ○ | Approved ○ | — | — | — | — |
| | Department The User Does Not Belong To | Read Changed Push | Read Changed Push | × | Participated ○ Nonparticipated X | Participated ○ Nonparticipated X | × | — | — | — |
| | During Meeting | Read | Read | Δ (Presentation Synchronous Display) | ○ | ○ | × | (Presentation Synchronizing Function ON) | — | 30 Minutes |

Fig. 4(C) Event Type "Visit To Customer"

| State | File Server | | | Cache | | | Application | Communication | Lock |
|---|---|---|---|---|---|---|---|---|---|
| | Secret | General | Exceptional | Secret | General | Exceptional | | | |
| In-House | — | — | — | Approved ○ | Approved ○ | — | — | — | — |
| In Transit | — | sync | — | ○ Inaccessible | ○ | × | web.mail&CRM@VPN | FTP:X | 5 Minutes |
| During Visit | Read | sync | Read Access Notification | ○ | ○ | ○ | web.mail&CRM@VPN | FTP:X | 30 Minutes |
| During Return | × | sync | × | × | ○ | × | web.mail&CRM@VPN | FTP:X | 5 Minutes |

Fig.5(A) Event Type "Business Trip"

| State | | File Server | | | Cache | | | Application | Communication | Lock |
|---|---|---|---|---|---|---|---|---|---|---|
| | | Secret | General | Exceptional | Secret | General | Exceptional | | | |
| In-House | | - | - | - | Approval◎ | Approval◎ | - | - | - | - |
| Outside | In Transit | sync Access Notification | sync | Read Access Notification | ○ | ○ | × | web, mail&CRM@VPN | FTP:X | 5 Minutes |
| | During Visit | Read | sync | Read Access Notification | ○ | ○ | ○ | web, mail&CRM@VPN | FTP:X | 30 Minutes |
| | During Return | Read Access Notification | sync | Read Access Notification | × | ○ | × | web, mail&CRM@VPN | FTP:X | 5 Minutes |

Fig.5(B) Event Type "Satellite Office"

| State | | File Server | | | Cache | | | Application | Communication | Lock |
|---|---|---|---|---|---|---|---|---|---|---|
| | | Secret | General | Exceptional | Secret | General | Exceptional | | | |
| Satellite Office | In-House LAN Connection | sync | sync | sync | ○ | ○ | ○ | All Applications Available | Default | 15 Minutes |
| | In-House LAN Disconnection | × | × | × | ○ | ○ | ○ | Only Web In Communication | FTP:X | 5 Minutes |

Fig.5(C) Event Type "Resident In Customer Site"

| State | File Server | | | Cache | | | Application | Communication | Lock |
|---|---|---|---|---|---|---|---|---|---|
| | Secret | General | Exceptional | Secret | General | Exceptional | | | |
| Customer Site | sync Access Notification | sync | Read Access Notification | × | ○ | × | web, mail&CRM@VPN | FTP:X | 15 Minutes |

Fig.5(D) Event Type "Work-At-Home"

| State | File Server | | | Cache | | | Application | Communication | Lock |
|---|---|---|---|---|---|---|---|---|---|
| | Secret | General | Exceptional | Secret | General | Exceptional | | | |
| At Home | sync Access Notification | sync | Read Access Notification | × | ○ | × | web, mail&CRM@VPN | FTP:X | 5 Minutes |

Fig.6(A)

| Condition | | | | Operation | | |
|---|---|---|---|---|---|---|
| Type | Place | Period | Target Equipment | Type | Function | Setting |
| Server (TPO Or File Server) ||||||||
| Setting | In-House | At TPO Requirement Approval "Visit Date -1" | | Setting | sync | Folder (Secret & General) |
| Setting | Outside | Visit Date (0:00 To Start Time) | | Setting | Access (+/-) | Folder |
| Setting | Customer Site | Visit Date (Start Time To Termination Time) | | Setting | Access (+/-) | Folder (Secret & Exceptional) |
| Setting | Outside | Visit Date (Termination Time To 24:00) | | Setting | Access (+/-) | Folder (Secret & Exceptional) |
| Terminal Monitoring | Outside | Visit Date (Termination Time To 24:00) | | Execution | Cache (clear) | Folder (Secret & Exceptional) |
| Portable Terminal ||||||||
| Terminal Monitoring | Outside | Visit Date (0:00 To Start Time) | | Setting | Cache (r/-) | Folder (Secret) |
| | | | | Execution | Cache (clear) | Folder (Exceptional) |
| | | | | Setting | Application | Limit To Web, Mail & CRMVPN |
| | | | | Setting | Communication | FTP Block |
| | | | | Setting | Lock | 5 Minutes |
| Terminal Monitoring | Customer Site | Visit Date (Start Time To Termination Time) | | Setting | Cache (r/w) | Folder (General) |
| | | | | Setting | Cache (r/-) | Folder (Secret & Exceptional) |
| | | | | Setting | Application | Limit To Web, Mail & CRMVPN |
| | | | | Setting | Communication | FTP Block |
| | | | | Setting | Lock | 30 Minutes |
| Terminal Monitoring | Customer Site | Visit Date (Termination Time To 24:00) | | Execution | Cache (clear) | Folder (Secret & Exceptional) |
| Terminal Monitoring | Outside | Visit Date (Termination Time To 24:00) | | Setting | Lock | 5 Minutes |

Fig.6(B)

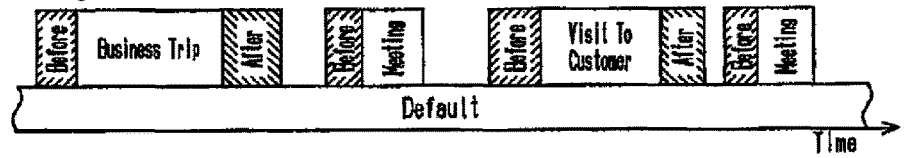

| | | Condition | | | Operation | | |
|---|---|---|---|---|---|---|---|
| | Type | Place | Period | Target Equipment | Type | Function | Setting |
| Server (TPO Or File Server) | Setting | In-House | At TPO Requirement Approval 2011/mm/dd-1 | A Terminal | Execution | sync | X Company¥Cache¥Visit¥2011mmdd¥Secret&¥General |
| | Setting | In-House | | B Terminal | Execution | sync | X Company¥Cache¥Visit¥2011mmdd¥Secret&¥General |
| | Setting | Outside | 2011/mm/dd 0:00-16:00 | A Terminal | Setting | Access (-/-) | X Company¥Cache¥Visit¥2011mmdd¥Secret&¥Exceptional |
| | Setting | Outside | 2011/mm/dd 0:00-16:00 | B Terminal | Setting | Access (-/-) | X Company¥Cache¥Visit¥2011mmdd¥Secret&¥Exceptional |
| | Setting | Customer Site | 2011/mm/dd 16:00-17:30 | A Terminal | Setting | Access (r/-) | X Company¥Cache¥Visit¥2011mmdd¥Secret&¥Exceptional |
| | Setting | Customer Site | 2011/mm/dd 16:00-17:30 | B Terminal | Setting | Access (r/-) | X Company¥Cache¥Visit¥2011mmdd¥Secret&¥Exceptional |
| | Setting | Outside | 2011/mm/dd 17:30-24:00 | A Terminal | Setting | Access (-/-) | X Company¥Cache¥Visit¥2011mmdd¥Secret&¥Exceptional |
| | Setting | Outside | 2011/mm/dd 17:30-24:00 | B Terminal | Setting | Access (-/-) | X Company¥Cache¥Visit¥2011mmdd¥Secret&¥Exceptional |
| | Terminal Monitoring | Outside | 2011/mm/dd 17:30-24:00 | A Terminal | Execution | Cache (clear) | X Company¥Cache¥Visit¥2011mmdd¥Secret&¥Exceptional |
| | Terminal Monitoring | Outside | 2011/mm/dd 17:30-24:00 | B Terminal | Execution | Cache (clear) | X Company¥Cache¥Visit¥2011mmdd¥Secret&¥Exceptional |
| Portable Terminal (A Terminal, B Terminal) | Terminal Monitoring | Outside | 2011/mm/dd 0:00-16:00 | | Setting | Cache (r/-) | X Company¥Cache¥Visit¥2011mmdd¥Secret |
| | | | | | Execution | Cache (clear) | X Company¥Cache¥Visit¥2011mmdd¥Exceptional |
| | | | | | Setting | Application | Limit To Web, Mail & CRM@VPN |
| | | | | | Setting | Communication | FTP Block |
| | | | | | Setting | Lock | 5 Minutes |
| | Terminal Monitoring | Customer Site | 2011/mm/dd 16:00-17:30 | | Setting | Cache (r/w) | X Company¥Cache¥Visit¥2011mmdd¥General |
| | | | | | Setting | Cache (r/-) | X Company¥Cache¥Visit¥2011mmdd¥Secret&¥Exceptional |
| | | | | | Setting | Application | Limit To Web, Mail & CRM@VPN |
| | | | | | Setting | Communication | FTP Block |
| | | | | | Setting | Lock | 30 Minutes |
| | Terminal Monitoring | Customer Site | 2011/mm/dd 17:30-24:00 | | Execution | Cache (clear) | X Company¥Cache¥Visit¥2011mmdd¥Secret&¥Exceptional |
| | Terminal Monitoring | Outside | 2011/mm/dd 17:30-24:00 | | Setting | Lock | 5 Minutes |

INFORMATION MANAGEMENT SYSTEM AND INFORMATION MANAGEMENT METHOD

CROSS-REFERENCE TO RELATED APPLICATIONS

This application is a continuation of U.S. patent application Ser. No. 14/237,146, filed on Mar. 28, 2014, which is a U.S. National Phase of PCT/JP2012/070111, filed Aug. 7, 2012, the complete disclosure of which is herein incorporated by reference.

FIELD OF THE INVENTION

The present invention relates to an information management system and an information management method that ensure the security of information stored in controlled equipment used in various situations according to period, place, and utilization purpose.

BACKGROUND OF THE INVENTION

Recently, portable terminals such as smartphones, tablet terminals, and notebook personal computers have been used in the business scene. When secret files in addition to public information are stored in such portable terminals and the portable terminals are brought out from a security area such as a workplace, it is necessary to take security measures for information leakage and so on.

Therefore, techniques have been proposed that achieve security management in consideration of the user utilization state in a service of providing a storage area via an information network (refer to, for example, Patent Document 1). According to the technique described in this document, a storage device for offering a service of allowing a user's terminal to use the storage area is connected to the terminal via the network. The user sets location information of the terminal for access to the storage device, user schedule, and access conditions to perform security management in consideration of the user utilization state, thereby preventing an unauthorized access to data in the storage device.

Security automatic control systems for ensuring security of mobile communication terminals have been also proposed (refer to, for example, Patent Document 2). According to the technique described in this document, a schedule matching determination section of a mobile communication terminal determines whether or not a user's actual activity matches a schedule stored in a schedule storage section. When it is determined that the user's activity does not match the schedule, a security control section performs operational control based on a security operational rule corresponding to a predetermined security pattern.

Techniques for improving security of information terminals have also been proposed (refer to, for example, Patent Document 3). The technique described in this document utilizes user unique information, for example, unique identification information of a portable information communication terminal, such as a serial number of the terminal and a phone number, which are incorporated in the portable information communication terminal, and a user-set password. Further, the technique controls time when the portable information communication terminal can access information, and limits place where information can be accessed or the user unique number can be changed according to location information acquired by means of a GPS (Global Positioning System) function of the portable information communication terminal.

PRIOR ART DOCUMENTS

Patent Documents

Patent Document 1: Japanese Laid-Open Patent Publication No. 2003-140968 (page 1, FIG. 1)
Patent Document 2: Japanese Laid-Open Patent Publication No. 2006-352561 (page 1, FIG. 1)
Patent Document 3: Japanese Laid-Open Patent Publication No. 2006-115433 (page 1, FIG. 1)

SUMMARY OF THE INVENTION

In recent years, needs for portable terminals have grown in various situations. Such portable terminals are used in various periods and places. As shown in FIG. 12, it is desirable to manage the portable terminal during a period of a schedule-registered event (main event) as well as during periods of related events for preparation and post-handling before and after the registered event.

Even during a period when no event is registered, a security management method varies depending on whether or not the period belongs to working hours. Especially during non-working hours, in particular, late at night, the number of workers in the office decreases and therefore, security needs to be enhanced.

As for places, the portable terminal may be used in business bases, customer sites, public places (public areas), and so on. The business bases include in-house bases and outside bases. The in-house bases include conference rooms in the company in addition to general working areas. The outside bases include satellite offices, home offices, and resident areas.

As for customer sites, new customers having no business transaction history and existing customers have different security environments. Further, in the existing customers, there are cases where confidentiality obligation is constituted under a non-disclosure agreement (NDA), and where confidentiality obligation is not constituted under the non-disclosure agreement (No-NDA).

The public areas include public transport systems and accommodation facilities. When the portable terminal is used in such public areas, security management varies according to the areas.

To properly perform information management in the portable terminal used in various periods and places, it is required to set security for information management properly and particularly. However, manual setting becomes a large burden.

The present invention is devised to solve the above-mentioned problems, and its object is to provide an information management system and an information management method that ensure security of information stored in controlled equipment used in various situations according to period, place, and utilization purpose while considering the user's convenience.

To achieve the foregoing objective and in accordance with the invention of claim 1, an information management system is provided that includes a secure set storage means configured to register an event definition template containing operational control information for controlling an operation of controlled equipment for an event type, an event managing means configured to perform setting for limiting the operation of the controlled equipment, and the controlled equipment. The event managing means: acquires an event requirement defined by an event place, an event period, and an event participant for the event type; identifies an event definition template corresponding to the event type in the secure set storage means; identifies the controlled equipment used by the participant recorded in the event requirement; and sets, for the controlled equipment, an event definition that is operational control information included in the event definition template for an event condition including the event place and the event period as elements. The controlled equipment: identifies a current state including current location and current date and time; and compares the current state with the event condition, and controls the operation of the controlled equipment based on the operational control information according to a comparison result.

According to the invention of claim 2, in the information management system according to claim 1, security area operational control information associated with information for identifying security-ensured place and non-security area operational control information associated with information for identifying security-unensured place are initially set in the controlled equipment.

According to the invention of claim 3, in the information management system according to claim 1 or 2, operational control information on the event place and a period related to the event period for the event type is set in the event definition template.

According to the invention of claim 4, in the information management system according to any one of claims 1 to 3, in the case where a mismatch is partially present in the comparison result of the current state and the event condition, the controlled equipment executes security checking processing for checking content of the mismatch. In the case where it is determined that the content of the mismatch has no problem in the security checking processing, the operation of the controlled equipment is controlled based on operational control information applied in the case where no mismatch is present in the comparison result.

According to the invention of claim 5, in the information management system according to claim 4, in the case where the content of the mismatch falls within a predetermined allowable range, the security checking processing is executed.

According to the invention of claim 6, in the information management system according to any one of claims 1 to 5, the controlled equipment is connected to a file server that stores a file used in the event via a network, and the event requirement includes a file identifier of the file used in the event. File access authority in the event requirement is set in the operational control information. Before the event period, the controlled equipment acquires the file having the file identifier included in the event requirement from the file server, and stores the file in a temporary storage means in the controlled equipment. According to the comparison result, the controlled equipment allows access to the file stored in the temporary storage means based on the access authority set in the operational control information.

According to the invention of claim 7, in the information management system according claim 6, the temporary storage means of the controlled equipment is provided with a folder corresponding to access authority. The controlled equipment: stores the file used in the event in the folder corresponding to access authority set in the event requirement; and allows access to the folder based on access authority set in the operational control information.

According to the invention of claim 8, in the information management system according claim 6 or 7, when detecting leaving from the event place or termination of the event period according to the comparison result, the controlled equipment deletes the file stored in the temporary storage means.

According to the invention of claim 9, in the information management system according to any one of claims 1 to 8, the operational control information includes an application identifier of an application. The controlled equipment controls the operation of the application having the application identifier included in the operational control information according to the comparison result.

According to the invention of claim 10, in the information management system according to any one of claims 1 to 9, the operational control information includes a waiting time taken to activate a security lock of the controlled equipment. The controlled equipment activates the security lock based on the waiting time included in the operational control information according to the comparison result.

According to the invention of claim 11, in the information management system according to any one of claims 1 to 10, in the case where an event group consisting of a plurality of predetermined correlated events occurring in a certain period is identified, based on operational control information of one or some of the events in the event group, the event managing means modifies operational control information of other events in the event group.

According to the invention of claim 12, an information management method using an information management system is provided. The information management system includes a secure set storage means configured to register an event definition template containing operational control information for controlling an operation of controlled equipment for an event type, an event managing means configured to perform setting for limiting the operation of the controlled equipment, and the controlled equipment. The event managing means: acquires an event requirement defined by an event place, an event period, and an event participant for the event type; identifies an event definition template corresponding to the event type in the secure set storage means; identifies the controlled equipment used by the participant recorded in the event requirement; and sets, for the controlled equipment, an event definition that is operational control information included in the event definition template for an event condition including the event place and the event period as elements. The controlled equipment: identifies a current state including current location and current date and time; and compares the current state with the event condition, and controls the operation of the controlled equipment based on the operational control information according to a comparison result.

Operation

According to the invention of claim 1 or 12, in the case where the event period, the place, and the participant are registered, the operation of the controlled equipment can be controlled based on the current location and the current time of the controlled equipment of the participant. Thereby, security management of the controlled equipment can be efficiently performed according to place, period, or situations.

According to the invention of claim 2, security area operational control information associated with information for identifying security-ensured place and non-security area operational control information associated with information for identifying security-unensured place are initially set.

Thus, even in the case where no event is registered, operational control in consideration of security by default can be performed.

According to the invention of claim 3, operational control information on the event place and a period related to the event period for the event type is set in the event definition template. Thus, by registering the event period and place, operational control information in periods before and after the event can be set without any load.

According to the invention of claim 4, in the case where a mismatch is present in the comparison result of the current state and the event condition, the controlled equipment executes security checking processing for checking content of the mismatch. In the case where it is determined that the content of the mismatch has no problem in the security checking processing, the operation of the controlled equipment is controlled based on operational control information applied in the case where no mismatch is present in the comparison result. Thus, even when an unexpected situation occurs, security status can be checked to change operational control.

According to the invention of claim 5, in the case where the content of the mismatch falls within a predetermined allowable range, the security checking processing is executed. Thus, in the case where a difference from the event condition is small, control to allow a predetermined operation can be made in the security checking processing.

According to the invention of claim 6, before the event period, the controlled equipment acquires the file having the file identifier included in the event requirement from the file server, and stores the file in a temporary storage means in the controlled equipment. According to the comparison result, the controlled equipment allows access to the file stored in the temporary storage means based on the access authority set in the operational control information. Thus, the file stored in the controlled equipment can be used in the event. Therefore, even when the network cannot be used, the files can be used while ensuring security.

According to the invention of claim 7, the controlled equipment stores the file used in the event in the folder corresponding to access authority set in the event requirement. The controlled equipment allows access to the folder based on access authority set in the operational control information. Thus, use of the file can be limited based on the access authority to the folder.

According to the invention of claim 8, when detecting leaving from the event place or termination of the event period according to the comparison result, the controlled equipment deletes the file stored in the temporary storage means. Thus, security management can be properly performed by deleting the file after the event.

According to the invention of claim 9, the controlled equipment controls the operation of the application having the application identifier included in the operational control information according to the comparison result. Thus, the operation of the application can be controlled in consideration of the event period and place. For example, operational control to allow activation of the application used in the event can be performed. At theft and the like, the application can be automatically activated to collect information. Activation of a predetermined application can be inhibited. Further, operational control to install an application necessary for the event can be performed.

According to the invention of claim 10, the controlled equipment activates the security lock based on the waiting time included in the operational control information according to the comparison result. Thus, operational limitation such as screen lock can be performed in consideration of the event period and place.

According to the invention of claim 11, in the case where an event group consisting of a plurality of interrelated events occurring in a certain period is identified, based on operational control information of one or some of the events in the event group, the event managing means modifies operational control information of other events in the event group. Thus, operational limitation can be adjusted based on interrelationship between a plurality of events occurring in a certain period (for example, at the same time or in a predetermined period). For example, in the case where the event overlap a plurality of hierarchies or a plurality of events occur in a predetermined period, each event can be controlled based on the interrelationship.

Effects of the Invention

According to the present invention, it is possible to provide an information management system and an information management method that ensure security of information stored in controlled equipment used in various situations according to period, place, and utilization purpose while considering the user's convenience.

BRIEF DESCRIPTION OF THE DRAWINGS

FIG. 2(A) is an explanatory diagram illustrating data recorded in storage sections used in this embodiment, where the chart shows a secure set of storage section of a TPO server.

FIG. 2(B) is an explanatory diagram illustrating a place definition storage section of the TPO server.

FIG. 2(C) is an explanatory diagram illustrating a TPO requirement storage section of the TPO server.

FIG. 2(D) is an explanatory diagram illustrating a TPO definition storage section of the TPO server.

FIG. 2(E) is an explanatory diagram illustrating a TPO definition storage section of portable terminal.

FIG. 3 is an explanatory diagram illustrating a processing procedure in this embodiment;

FIG. 4(A) is an explanatory diagram illustrating a secure data set showing the secure set of default.

FIG. 4(B) is an explanatory diagram illustrating a secure data set showing the secure set of meeting.

FIG. 4(C) is an explanatory diagram illustrating a secure data set showing the secure set of visit to customer.

FIG. 5(A) is an explanatory diagram illustrating a secure set of business trip.

FIG. 5(B) is an explanatory diagram illustrating a secure set of satellite office.

FIG. 5(C) is an explanatory diagram illustrating a secure set of resident in customer site.

FIG. 5(D) is an explanatory diagram illustrating a secure set of work-at-home.

FIG. 6(A) is an explanatory diagram illustrating a secure set showing a TPO definition template set.

FIG. 6(B) is an explanatory diagram illustrating a secure data set showing a hierarchy of the secure set.

FIG. 10 is an explanatory diagram illustrating TPO definition in this embodiment;

DETAILED DESCRIPTION OF THE PREFERRED EMBODIMENTS

Figure 1:
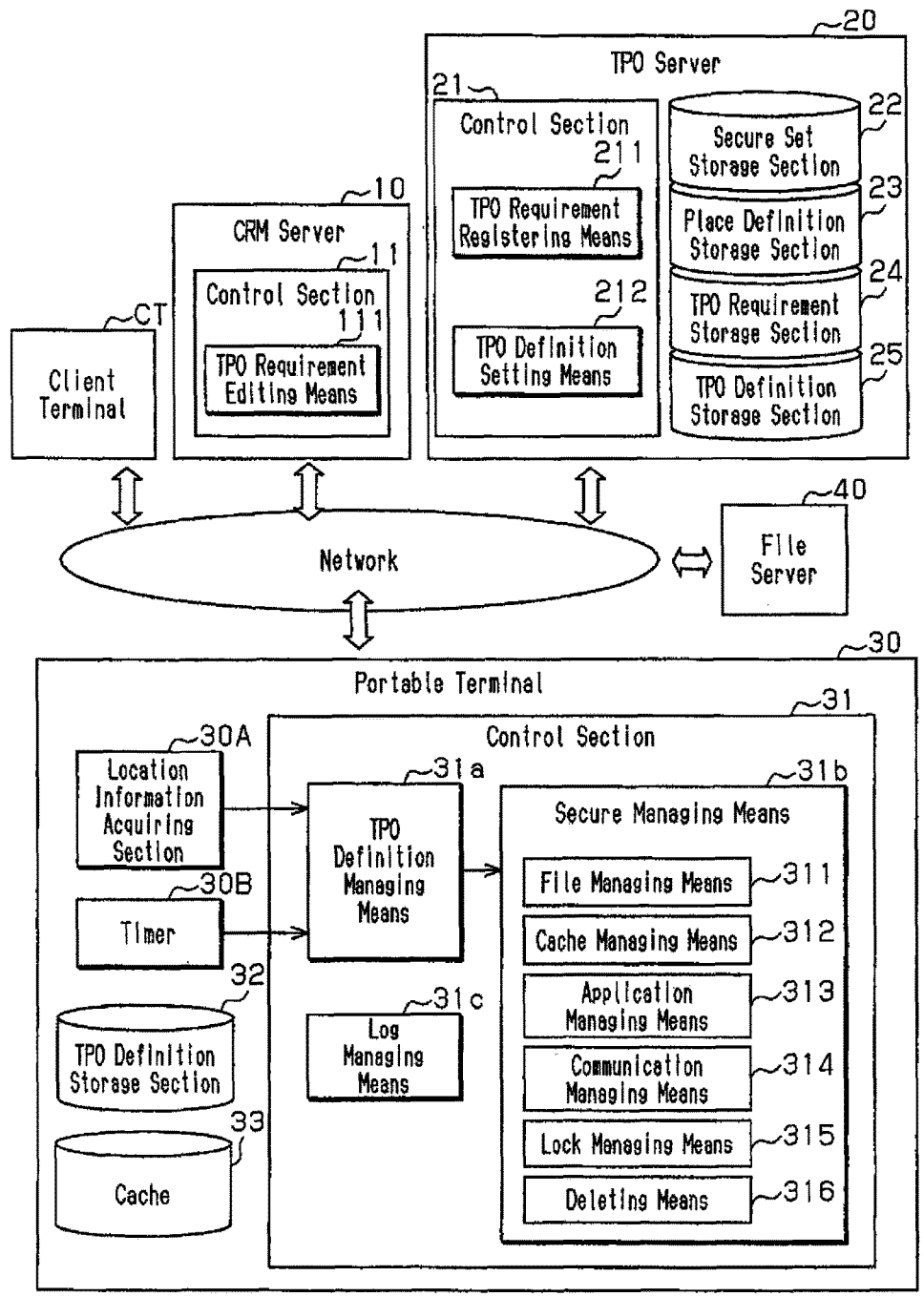
FIG. 1 is an explanatory diagram illustrating an information management system according to one embodiment of the present invention.

An information management system according to one embodiment of the present invention will be described below with reference to FIGS. 1 to 11. In this embodiment, it is assumed that a person in charge (user) in a company uses a portable terminal in business operations. The user creates document files in an in-house base and explains products in customer sites by using document files and various applications. In this embodiment, as shown in FIG. 1, a client terminal CT, a CRM server 10, a TPO server 20, a portable terminal 30, and a file server 40 are used. In this embodiment, the portable terminal 30 and the file server 40 function as controlled equipment.

The client terminal CT is a computer terminal that the user and the administrator of the portable terminal 30 use to apply for approval of schedule or approve application. The client terminal CT includes a display section (display or the like) and an input section (keyboard, pointing device, or the like). In this embodiment, the user of the portable terminal 30 accesses the CRM server 10 by use of the client terminal CT, and applies for approval of event schedule. The administrator accesses the CRM server 10 by use of the client terminal CT to approve applied content.

The CRM server 10 is a computer system for customer relationship management (CRM). In this embodiment, the user inputs applied content of a user-related event and edits the applied content by use of the client terminal CT. The administrator of the user checks the applied content and approves the applied content if no problem exists. The applied content thus approved as a TPO (the time, the place, and the occasion) requirement is converted into a TPO definition for controlling the portable terminal 30 and so on as described later.

The CRM server 10 has a control section 11 for performing customer relationship management and event management. The control section 11 includes a control means (CPU, RAM, or ROM) to execute processing in a TPO requirement edition stage. As shown in FIG. 1, the control section 11 executes a TPO requirement edition program, thereby functioning as a TPO requirement editing means 111.

The TPO requirement editing means 111 executes processing of managing application for approval of schedule of an event that user participates, and editing the TPO requirement based on the applied content approved by the administrator.

The TPO server 20 functions as an event managing means for performing setting to limit the operation of the portable terminal 30, specifically, executes processing of creating the TPO definition based on the approved TPO requirement. The TPO definition is setting information for performing security management of the system (here, the portable terminal 30, the TPO server 20, and the file server 40) in an applied event (main event) and a related event accompanied with the main event. In this embodiment, an event prior to the main event (preceding event) and an event after the main event (subsequent event) are set as the related events. The TPO server 20 includes a control section 21, a secure set storage section 22, a place definition storage section 23, a TPO requirement storage section 24, and a TPO definition storage section 25.

The control section 21 includes a control means (CPU, RAM, or ROM), and executes the below-mentioned processing (processing in a TPO requirement registration stage and a TPO definition setting stage). As shown in FIG. 1, the control section 21 executes an information management program (on the server side), thereby functioning as a TPO requirement registering means 211 and a TPO definition setting means 212.

The TPO requirement registering means 211 executes processing of acquiring the TPO requirement from the CRM server 10 and registering the TPO requirement in the TPO requirement storage section 24.

The TPO definition setting means 212 executes processing of generating the TPO definition from the TPO requirement, recording the TPO definition in the TPO definition storage section 25, and setting the TPO definition in the target portable terminal 30.

The secure set storage section 22 functions as a secure set storage means. As shown in FIG. 2(A), the secure set storage section 22 records secure set data 220 for generating the TPO definition from the TPO requirement therein. The secure set data 220 is recorded when setting necessary for security management (TPO definition) that corresponds to the TPO requirement is registered. A TPO definition template set for each event type is recorded in the secure set data 220.

Data on an identifier for identifying the event type specified by the TPO requirement is recorded in an event type data area.

TPO definition models (templates) for controlling the TPO server 20, the portable terminal 30, and the file server 40 are recorded in a TPO definition template set data area. The TPO definition can be generated by setting each element (event place, event period) specified by the TPO requirement in the TPO definition template set. A TPO definition execution section (security setting) sets security in the controlled equipment (portable terminal 30) specified by the TPO requirement.

FIGS. 4(A), 4(B), 4(C) and 5(A), 5(B), 5(C) and 5(D) show summary of security setting based on the secure set data 220. FIGS. 4(A), 4(B), 4(C) and 5(A), 5(B), 5(C) and 5(D) show summary of security setting for "state" in each event type. Here, an event type "default" (FIG. 4(A)), an event type "meeting" (FIG. 4(B)), an event type "visit to customer" (FIG. 4(C)) will be described as an example of a secure set. An event type "business trip"(FIG. 5(A)), an event type "satellite office"(FIG. 5(B)), an event type "resident in customer site"(FIG. 5(C)), event type" work-at-home"(FIG. 5(D)) will be also described.

"Secret" files shown in the example of the secure set are high confidential files among files the user is allowed to use. "General" files are low confidential files among the files the user is allowed to use. "Exceptional" files are files that relate to customers who disclose applied-approved bring-out information or bring-out purpose and information, and are exceptionally allowed to be referred if needed according to situations. Examples of the exceptional files include past visit (discussion) information and information on another matter of the existing customer.

As shown in FIG. 4(A), for the event type "default," security area operational control information for initializing a security area (in-house) in which security is ensured and non-security area operational control information for initializing a non-security area (outside) in which security is not ensured. This secure set is initially set in each portable terminal 30 in advance. Determination of "in-house" or "outside" is made by use of LAN connection location information or GPS location information as described later.

In this secure set, the setting of in-house differs between "in-house LAN connection" at normal time and "in-house LAN disconnection" due to network failure, and the setting of outside differs according to whether the portable terminal 30 is "not permitted to be brought out" or "permitted to be brought out." In the secure set at the normal "in-house LAN connection" time, in the portable terminal 30 as controlled equipment, setting information for synchronizing with the file server 40 (in the figure, "sync") is recorded. Setting information for allowing access to files stored in a cache (in the figure, "O") is also recorded. Further, setting information for allowing the portable terminal 30 to use all of authorized applications is recorded. Further, setting information for extending a waiting time taken to actuate operational limitation such as screen lock (security lock) is recorded.

In the secure set of "in-house LAN disconnection" due to network failure, the portable terminal 30 as controlled equipment cannot synchronize with the file server 40, but setting information for enabling access to the files stored in the cache is recorded. In the portable terminal 30 "not permitted to be brought out," setting information for actuating tracking software of detecting the location of this terminal, collecting surrounding information (image and sound), and informing such information is recorded. Further, setting information for rejecting synchronization with the file server 40, and use of the cache and other applications is recorded. Although the portable terminal 30 "permitted to be brought out" cannot access the file server 40 or the cache, setting information for enabling a communication application is recorded.

As shown in FIG. 4(B), in the secure set of the event type "meeting", operational control information on the event "meeting" (area surrounded with a double line), and operational control information on the related event "pre-event" in a period associated with the meeting period are recorded. In the secure set, the setting differs between "department the user belongs to" or "department the user does not belong to (pre-event, during meeting)". Here, in the portable terminal 30 as the controlled equipment, in the case of the department the user belongs to, on the condition of "approval" of the administrator, setting information for enabling viewing of files in the file server 40 is recorded in "before meeting (pre-event)" (in the figure, "read"). On the condition of "participation" of the user, setting information for storing files in the cache of the portable terminal 30 is recorded. On the condition of "nonparticipation" of the user, setting information for deleting files stored in the cache is recorded. In "during meeting", setting information for enabling viewing files in the file server 40 and the cache is recorded.

As shown in FIG. 4(C), in the secure set of the event type "visit to customer", operational control information on the event "during visit" (area surrounded with a double line), and operational control information on the related events "in transit" and "during return" before and after the period of the event "during visit" are recorded. In this secure set, setting differs among "in-house", "in transit", "during visit", and "during return". In "in-house", on the condition of "approval" of the administrator about visit, setting information for enabling to use to the secret files and the general files in the cache. In "in transit", about the general files, setting information for synchronizing with the file server 40 and enabling use of files stored in the cache. Further, setting information for shortening the waiting time taken to actuate the security lock to tighten security management. In "during visit," setting information for enabling the use of files is used for describing products to the customer. Further, about access to the exceptional files, setting information for notifying access to the administrator is recorded. In "during return", setting information for deleting the secret files and the exceptional files stored in the cache on the condition that the user leaves the event place or the event period ends.

As shown in FIG. 5(A), in the secure set of the event type "business trip", operational control information on the event "during visit" (area surrounded with a double line), and operational control information on the related events "in transit" and "during return" before and after the period of the event "during visit" are recorded. In this secure set, the setting differs among "in-house", "in transit", "during visit," and "during return." In "in transit" and "during return," setting information for allowing access to the secret files and the exceptional files in the file server 40 on the condition of notification of access to the administrator is recorded. Further, in "during return," setting information for deleting the secret files and the exceptional files stored in the cache on the condition that the user leaves the event place or the event period ends.

As shown in FIG. 5(B), in the secure set of the event type "satellite office," in "satellite site," setting information for performing the same operational control as in the own office is recorded.

As shown in FIG. 5(C), in the secure set of the event type "resident in customer site," in "customer site," setting information for allowing access to the secret files and the exceptional files stored in the file server 40 on the condition of notification of access to the administrator is recorded. Further, setting information for rejecting copying of the secret files and the exceptional files to the cache is recorded.

As shown in FIG. 5(D), in the secure set of the event type "work-at-home," in file access management at "home," setting information for performing the same operational control as in "resident in customer site" is recorded. Further, setting information for shortening the waiting time taken to actuate the security lock is recorded.

A specific example of the secure set will be described below with reference to FIG. 6(A). FIG. 6(A) shows an example of a TPO definition template set 500 as the secure set of the event type "visit to customer." In the TPO definition template set 500, the "state" in FIG. 4(C) is specifically represented as conditions "place" and "period", and setting information for controlling setting information and state transition in the main event and the related event is recorded. In the place "customer site" of the TPO definition template set 500, based on place information (base) set in the TPO requirement, place identification information extracted from the place definition storage section 23 is set. In "visit date," "start time," and "finish time", information corresponding to visit date and time set in the TPO requirement is set. In "folder" of the TPO definition template set 500, information corresponding to below-mentioned "folder" set in the TPO requirement is set. The TPO definition can be generated by setting each element contained in the TPO requirement to the TPO definition template set 500.

In FIG. 6(A), "access (r/w)" means that both of reading and writing are allowed, "access (r/-)" means that only reading is allowed, and "access (-/-)" means that neither reading nor writing is allowed.

As shown in FIG. 6(B), such a secure set is specified and hierarchized and then, applied to the portable terminal 30. Specifically, in the state where the TPO definition in the secure set shown in FIGS. 4(B) to 5(D) is not set, the operation of the portable terminal 30 is controlled according to the TPO definition in the default secure set which is initially set (FIG. 4(A)). In contrast, in the case where the TPO definition in the secure set shown in FIGS. 4(B) to 5(D) is set, the operation of the portable terminal 30 is controlled according to security setting of the execution section of each TPO definition on the condition that the event condition of each TPO definition is satisfied. In the secure set shown in FIGS. 4(B) to 5(D), the TPO definition corresponding to the preceding event or the subsequent event is set.

As shown in FIG. 2(B), the place definition storage section 23 records place definition data 230 for defining each place therein. The place definition data 230 is recorded in the case where the place where the portable terminal 30 can be used is recorded. The place definition data 230 includes data on name and place identification information.

Data on the name of the place where the portable terminal 30 can be used is recorded in a name data area. For example, a name of a business place of a customer company (for example, X company, head office) is used.

Information for detecting the place is recorded in a place identification information data area. For example, latitude/longitude range information for identifying location by GPS is recorded. The latitude/longitude range may be dynamically changed. Further, location can be identified based on the installation site of network equipment to be connected via LAN. For example, in the case of using LAN, the location is identified as "in-house." In "in-house LAN disconnection" due to LAN network failure, the location is identified using GPS location information.

As shown in FIG. 2(C), TPO requirement data 240 on the approved event is recorded in the TPO requirement storage section 24. The TPO requirement data 240 is recorded in the case where the administrator inputs approval of the applied content of the event in the CRM server 10. The TPO requirement data 240 includes data on event type, place, date and time, target person, target equipment, and bring-out information.

Data on an identifier for identifying the approved event type is recorded in the event type data area.

Data on the place (event place) where the event occurs is recorded in a place data area. In this embodiment, the name recorded in the place definition storage section 23 is used.

Data on the period (event period) when the event occurs is recorded in a date and time data area. In this embodiment, a range of year, month, day and time is used.

Data on an identifier for identifying a participant of the event is recorded in a target person data area. For example, in the case of visiting the customer site, information for identifying a visitor is recorded.

Data on an identifier for identifying controlled equipment (here, the portable terminal 30) is recorded in a target equipment data area. The portable terminal 30 can be identified based on the participant of the event.

Data on a file identifier for identifying the file brought out for the event is recorded in a bring-out information data area. In this embodiment, in the data area, a folder that is prepared in the file server 40 and stores bring-out information is designated. The file used for the event is stored in this folder.

As shown in FIG. 2(D), TPO definition data 250 is recorded in the TPO definition storage section 25. The TPO definition data 250 is recorded in the case where the TPO requirement is converted into the TPO definition. The TPO definition data 250 includes target equipment, a condition section, and an execution section.

Information for identifying controlled equipment (the portable terminal 30 and the file server 40) that controls operation is recorded in a target equipment data area.

Data on the event condition (place, date and time) as a condition for changing various setting of the controlled equipment is recorded in the condition section.

Data for identifying the place where the event occurs and the place where a related event accompanied with the event are recorded in the place data area.

Data on the year, month, day, and time range when the event occurs and the time range of the related event accompanied with the event is recorded in the date and time data area.

Data on security setting for ensuring security in the controlled equipment is recorded in the execution section.

Operational control information for controlling the controlled equipment is recorded in a security setting data area.

The portable terminal 30 is a computer terminal carried by the user for the event. In this embodiment, the portable terminal 30 is a tablet terminal provided with a touch panel display.

The portable terminal 30 includes a wireless communication section to communicate with the TPO server 20 and the file server 40. As shown in FIG. 1, the portable terminal 30 includes a location information acquiring section 30A, a timer 30B, a control section 31, a TPO definition storage section 32, and a cache 33.

The location information acquiring section 30A identifies the location of the portable terminal 30. For example, the location can be identified according to latitude/longitude information by using a GPS function. The timer 30B is a time register means, and identifies the current date and time.

The control section 31 includes a control means (CPU, RAM, or ROM), and executes below-mentioned processing (various types of processing in a TPO definition management stage, a secure management stage, and so on). As shown in FIG. 1, the control section 11 executes the information management program (for terminal) for the processing, thereby functioning as a TPO definition managing means 31a, a secure managing means 31b, and a log managing means 31c.

The TPO definition managing means 31a executes processing of checking the condition for security management based on period and place. In this embodiment, to ensure flexibility in "In" state transition to the main event and "Out" state transition from the main event, the below-mentioned TPO utility performs state transition control. Thus, the TPO definition managing means 31a outputs a TPO utility screen and an alert screen on the display.

The secure managing means 31b executes various types of control processing based on operational control information for security management. In this embodiment, the secure managing means 31b functions as a file managing means 311, a cache managing means 312, an application managing means 313, a communication managing means 314, a lock managing means 315, and a deleting means 316.

The file managing means 311 manages setting processing of access authority to the file server 40 based on the TPO definition. In this embodiment, access authority to the secret files, the general files, and the exceptional files is set. The file managing means 311 further manages synchronization processing of the files stored in the file server 40 and the files stored in the cache 33 based on the TPO definition.

The cache managing means 312 manages a registration of information to the cache 33, deletion of information recorded in the cache 33 or limitation of access to the information recorded in the cache 33, and copy processing of the bring-out information from the file server 40 based on the TPO definition. Further, the cache managing means 312 executes setting processing of the access authority to the cache 33 based on the TPO definition. In this embodiment, access authority to secret files, general files, and the like in the cache 33 is set.

The application managing means 313 executes availability determination processing of an application stored in the portable terminal 30 and setting processing of web filtering based on the TPO definition.

The communication managing means 314 executes management processing of usage authority of port and protocol, such as filtering and block of communication data, based on the TPO definition.

The lock managing means 315 executes lock control processing such as setting of waiting time taken to actuate the security lock and change of a password, based on the TPO definition.

The deleting means 316 executes deletion processing of information stored in the cache 33 based on the TPO definition.

The log managing means 31c executes processing of storing matching state of conditions of the TPO definition, setting execution state, user operation state, transition place and time from each event, and transition category, as a log. By outputting the log stored in the log managing means 31c, the utilization state of the portable terminal 30 can be checked later.

As shown in FIG. 2(E), TPO definition data 320 is recorded in the TPO definition storage section 32. The TPO definition data 320 is recorded in the case where the TPO definition of the portable terminal 30 is acquired from the TPO server 20. The TPO definition data 320 includes the same condition section and execution section as those of the TPO definition data 250 of the portable terminal 30.

The cache 33 is temporary storage means for storing bring-out information set in the approved TPO requirement. A folder structure stored in the file server 40 and the files in each folder are stored in the cache 33. The files stored in the cache 33 are synchronized with the files store in the file server 40 based on the operational control information.

Figure 8:
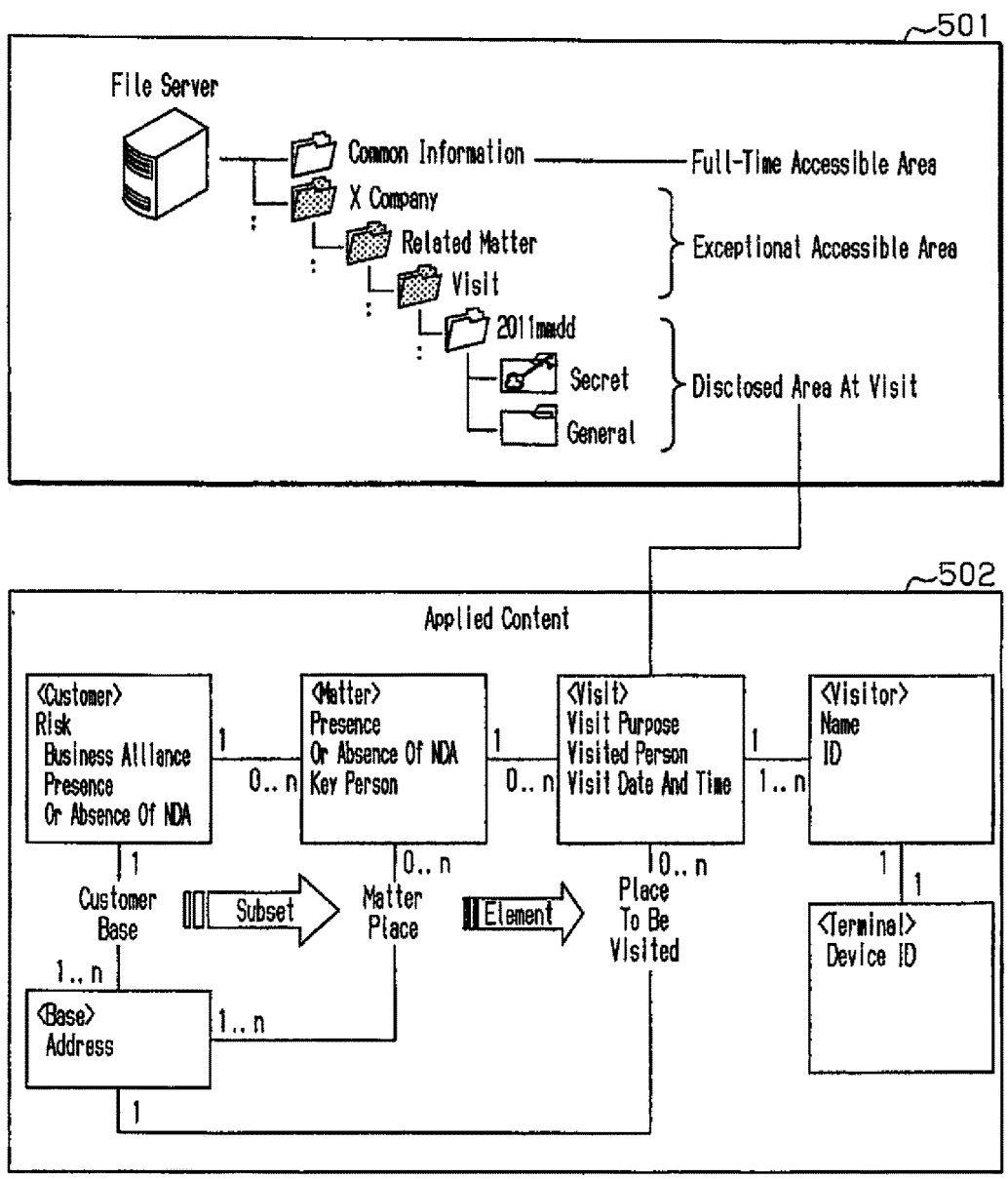
FIG. 8 is an explanatory diagram illustrating a folder structure in a file server and contents applied in a CRM server in this embodiment.

The file server 40 is a computer system for managing various files. In this embodiment, a folder structure 501 shown in FIG. 8 is provided in the file server 40 for users visiting the customer site. The folder structure 501 is configured of a full-time accessible area that can be accessed at all times and an exceptional accessible area that can be accessed when approved. Folders of target customer "X company," related matter, visit, visit date ("2011mmdd") are provided in the exceptional accessible area. In this embodiment, files that are recorded in the folders other than "2011mmdd" in the exceptional accessible area are the exceptional files. The general files of low security level and the secret files of high security levels are recorded in the "2011mmdd" folder. These files include a folder structure configured with a general folder that stores the general files and a secret folder that stores the secret files. In the case where a product is described to the customer by using the files stored in the folders, after approval of the administrator and before visit to customer, the file server 40 copies necessary files (bring-out information) to the cache 33 of the portable terminal 30 via a network. The file server 40 periodically synchronizes the files stored therein with the files stored in the cache 33 of the portable terminal 30. The synchronization may be performed when any file in the portable terminal 30 and the file server 40 is updated.

Operation in Information Management System

Next, operation in the information management system will be described with reference to FIG. 3. It is assumed that the user visits the customer site, and describes the product. For product description, the user uses various files and related applications that are stored in the cache 33 of the portable terminal 30.

Figure 7:
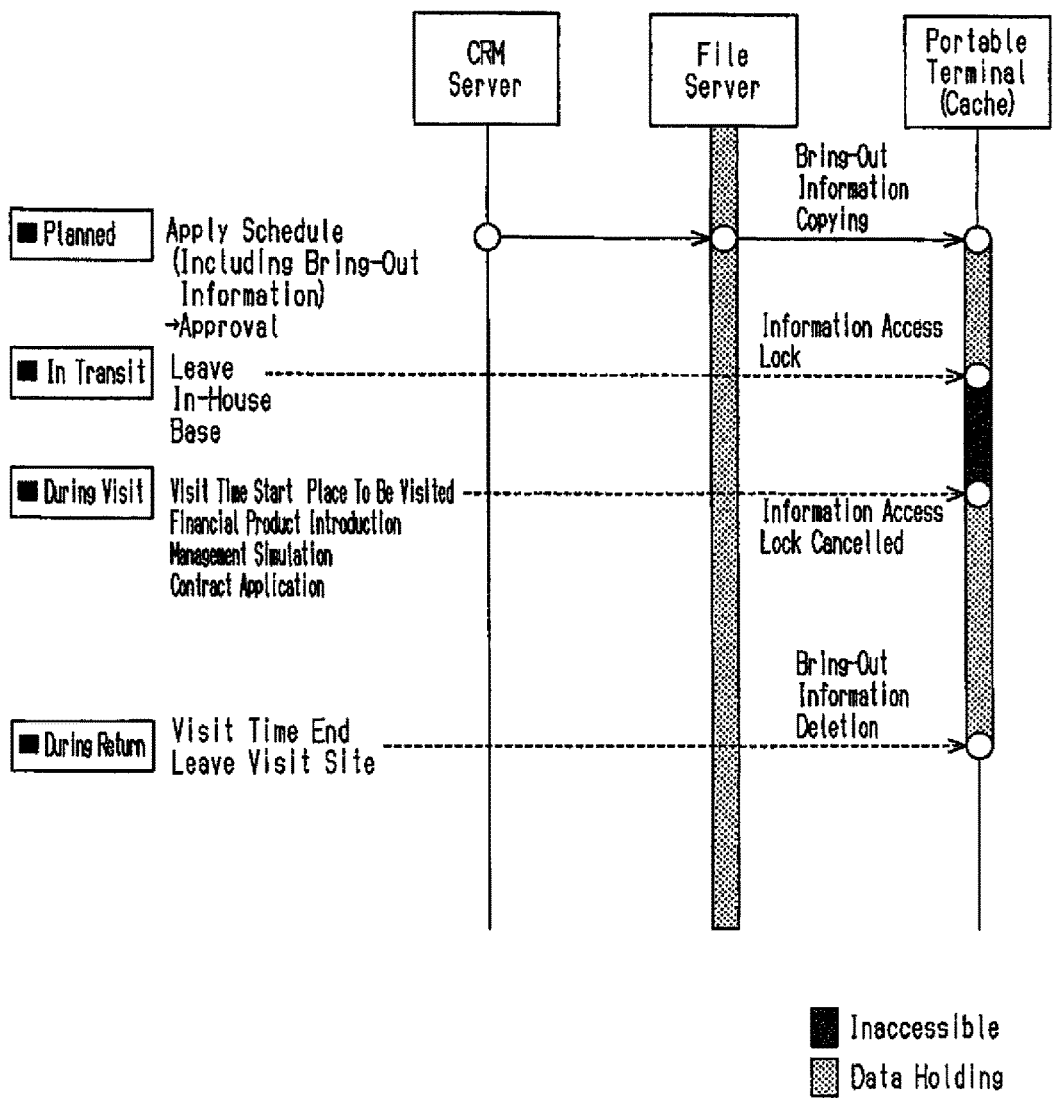
FIG. 7 is an explanatory diagram illustrating processing in each stage of visit to customer in this embodiment.

When the user visits the customer site, as shown in FIG. 7, there are stages of "planned," "in transit," "during visit," and "during return." Since security environment differs according to the stages, the operational of the portable terminal 30 is controlled according to the environment.

In the "planned" stage, in the CRM server 10, the user applies schedule including bring-out information. When the schedule is registered, the administrator approves the application of the schedule according to a work flow. This establishes an event. In this case, it is set that the portable terminal 30 can access bring-out information stored in the file server 40. Then, the bring-out information stored in the file server 40 can be copied to the cache 33 of the portable terminal 30. At establishment of the event, the bring-out information may be downloaded from the file server 40 to the portable terminal 30.

In the "in transit" stage, the user leaves the in-house base and the stage becomes "in transit." In this case, access to information in the cache 33 of the portable terminal 30 is locked.

In the "during visit" stage, visit time arrives, and the user gets close to the place to be visited place. In this case, locking of access to information is cancelled to make the bring-out information stored in the cache 33 of the portable terminal 30 available.

Further, in this stage, for example, in the case of the operation of a financial institution, financial products, management simulation, contract application, and the like are described. In this case, files for introducing the financial products are displayed, management simulation of the financial products is performed, and an access is made to an application accepting server for contract application. In this case, the portable terminal 30 controls various functions based on the TPO definition.

In the "during return" stage from the customer site, the registered scheduled visit time elapses, and the user leaves the visited place. In this case, the portable terminal 30 deletes the bring-out information stored in the cache 33.

As described above, by changing operational setting of the portable terminal 30 in each stage of the event "visit to customer," security is ensured while considering convenience of the user. Information processing in the CRM server 10, information processing in the TPO server 20, and information processing in the portable terminal 30 will be described below in this order.

Information Processing in CRM Server 10

First, the control section 11 of the CRM server 10 executes editing processing of the TPO requirement (Step S11). Specifically, in the case where the user is scheduled to describe products in the customer site, the user accesses the CRM server 10 in advance by using the client terminal CT.

To receive approval from the administrator, the user applies schedule in the CRM server 10. Here, information on customer, matter, visit, and visitor is registered in applied content 502 shown in FIG. 8. Further, based on customer information, a visit base is set in the applied content 502. For visit information, a folder that stores files used for product description (disclosed area at visit in the folder structure 501) is designated. For the applied content 502, the visitor sets one own portable terminal 30 depending on the visitors. When the user of the portable terminal 30 is determined, the controlled portable terminal 30 may be set based on the visitor. In this case, an equipment management information storage section in which user identification information is associated with identification information of the user's portable terminal 30 is provided. In this case, when the visitor is determined in the TPO requirement, the brought out portable terminal 30 can be determined by using the equipment management information storage section.

Figure 9:
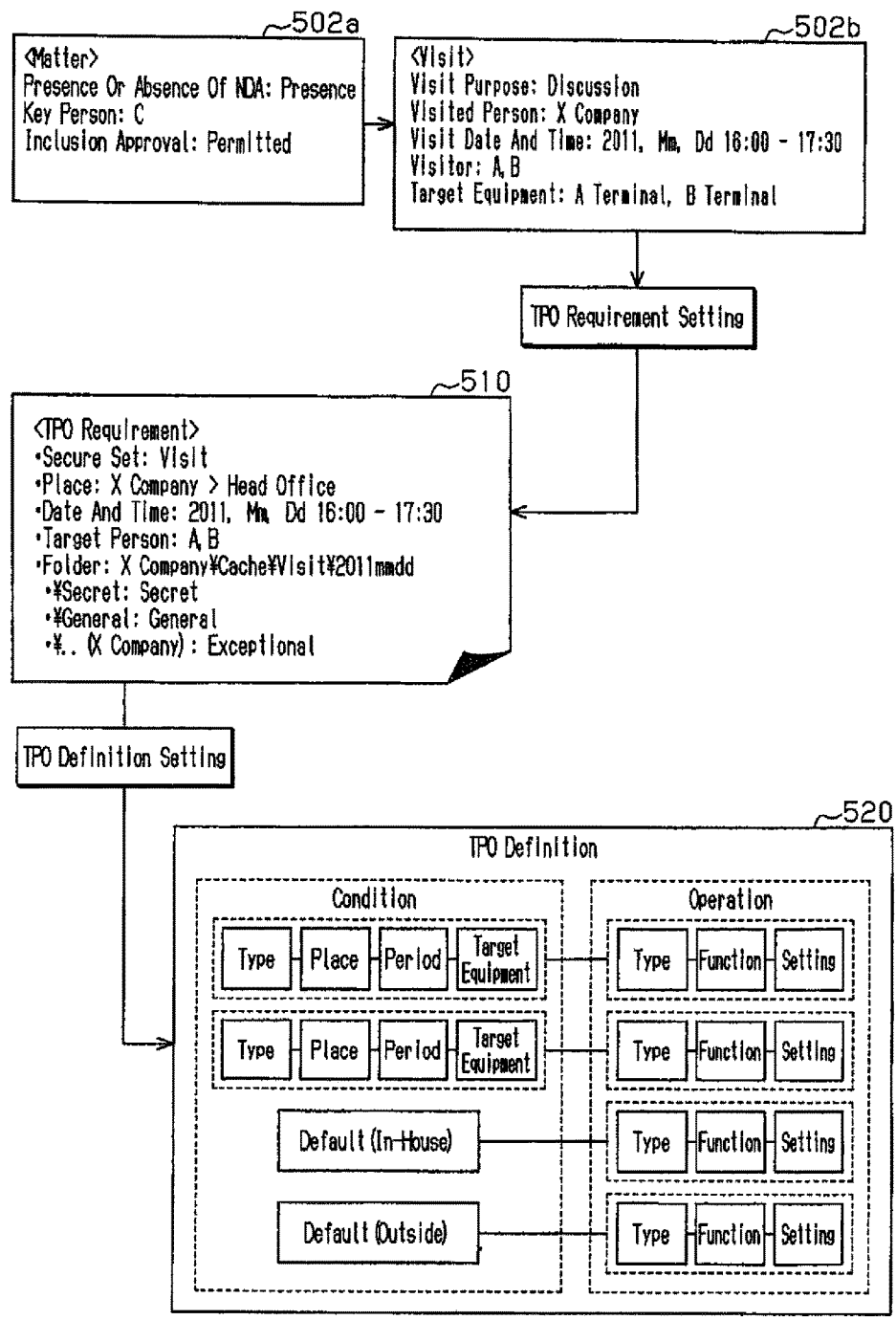
FIG. 9 is an explanatory diagram illustrating TPO requirement setting and TPO definition setting in this embodiment.

When the applied content 502 is registered, the CRM server 10 transmits a request to check the applied content 502 to the administrator. The administrator checks the applied content 502 stored in the CRM server 10 by use of the client terminal CT, and inputs approval if no problem exists. When approval is input, as shown in FIG. 9, the control section 11 of the CRM server 10 records approval information in matter information 502a.

In this case, the TPO requirement editing means 111 of the control section 11 generates TPO requirement data. Specifically, TPO matter data is generated based on visit information 502b corresponding to the matter information 502a into which approval is input. The visit information 502b includes data on visit purpose, visited person, visit date and time, visitor to own company, target terminal (used portable terminal 30).

In this case, the TPO requirement editing means 111 generates a TPO requirement 510 based on the visit information 502b. Here, based on the event "visit" in the applied content, the event type is identified. The TPO requirement 510 includes information on secure set, place, date and time, target person, and folder. Based on the secure set information, the used secure set data 220 can be identified in the secure set storage section 22. Information on place, and date and time is used to create the condition section of the TPO definition. Information on the target person is used to identify the portable terminal 30 to which the created TPO definition is set. Information on folder is used to identify bring-out information.

Information Processing in TPO Server 20

Next, information processing in the TPO server 20 will be described.

The control section 21 of the TPO server 20 executes TPO requirement registration processing (Step S21). Specifically, the TPO requirement registering means 211 of the control section 21 acquires the TPO requirement from the CRM server 10, and registers the TPO requirement in the TPO requirement storage section 24. In this embodiment, it is assumed that the TPO requirement 510 shown in FIG. 9 is registered.

Next, the control section 21 of the TPO server 20 executes conversion processing into the TPO definition (Step S22). Specifically, the TPO definition setting means 212 of the control section 21 generates the TPO definition based on the TPO requirement data 240 recorded in the TPO requirement storage section 24. In this case, the secure set data 220 corresponding to the event type recorded in the TPO requirement data 240 is extracted from the secure set storage section 22.

Next, the TPO definition setting means 212 identifies date and time (event period) of the TPO requirement. The TPO definition setting means 212 further extracts the place definition data 230 corresponding to the place name recorded in the TPO requirement data 240 from the place definition storage section 23.

Then, the TPO definition setting means 212 includes place, and date and time in the secure set data 220 to generate the TPO definition. Next, the TPO definition setting means 212 extracts target equipment information of the portable terminal 30, which is recorded in the TPO requirement data 240. Then, the TPO definition setting means 212 records the TPO definition data 250 associated with the extracted target equipment information in the TPO definition storage section 25.

In this embodiment, information included in the TPO requirement 510 shown in FIG. 9 is set to the TPO definition template set 500 to generate a TPO definition 520. In the TPO definition 520, operation (type, function, setting) is determined for condition (type, place, period, target equipment). Here, a TPO definition 530 shown in FIG. 10 is generated for the TPO definition template set 500. The TPO definition 530 includes setting information for operational control of the TPO server 20, the file server 40, and the portable terminal 30.

Next, the control section 21 of the TPO server 20 executes TPO definition setting processing (Step S23). Specifically, the TPO definition setting means 212 of the control section 21 offers the TPO definition to the identified portable terminal 30. In this case, the control section 31 of the portable terminal 30 registers the TPO definition acquired from the TPO server 20 in the TPO definition storage section 32.

Information Processing in Portable Terminal 30

Next, information processing in the portable terminal 30 will be described.

Here, the portable terminal 30 executes current location identification processing (Step S31). Specifically, the location information acquiring section 30A identifies the location of the portable terminal 30 by means of the GPS function or a connected network equipment.

The portable terminal 30 further executes current time identification processing (Step S32). Specifically, the TPO definition managing means 31a periodically identifies the current time in the timer 30B.

Then, the control section 31 of the portable terminal 30 executes state change monitoring processing (Step S33). Specifically, the TPO definition managing means 31a periodically acquires information on the current location from the location information acquiring section 30A. The TPO definition managing means 31a acquires information on the current time from the tinier 30B.

Then, the control section 31 of the portable terminal 30 executes TPO definition state transition check processing (Step S34). Specifically, the TPO definition managing means 31a of the control section 31 compares the current state (current location and current time) with the condition section of the TPO definition data 320, which is recorded in the TPO definition storage section 32. Then, the TPO definition managing means 31a determines whether or not the TPO definition state has shifted according to whether the current state has shifted from the currently-applied TPO definition condition to another TPO definition condition. In the case where the TPO definition state does not transition, the current setting is maintained.

In contrast, in the case where it is detected that the TPO definition state changes, the control section 31 of the portable terminal 30 executes TPO definition state transition notification processing (Step S35). Specifically, the TPO definition managing means 31a of the control section 31 notifies the state transition to the secure managing means 31b. This notification includes security setting information (operational control information) of the execution section of the TPO definition data 320, which is recorded in the TPO definition storage section 32.

In this case, the control section 31 of the portable terminal 30 executes individual control processing (Step S41). Specifically, the secure managing means 31*b* of the control section 31 controls the operation of the portable terminal 30 based on acquired operational control information. Here, based on the operational control information, the file managing means 311 executes file management processing (Step S42). The cache managing means 312 and the deleting means 316 execute cache management processing (Step S43). The application managing means 313 executes application management processing (Step S44). The communication managing means 314 and the lock managing means 315 execute communication management processing (Step S45) and lock management processing (Step S46).

State Transition Control

Next, state transition control will be described. There are (a) "In" state transition to the main event, and (b) "Out" state transition from the main event. This will be described using "visit to customer" as an example.

(a) "in" Transition to Main Event (a1) Normal Transition

In the case where the place matches the event condition, and the current time reaches "a predetermined time earlier (for example, five minutes earlier) than the start time," the TPO utility displays the alert screen representing transition to the main event state, and shifts to control based on main event setting.

(a2) First Specified Transition

In the case where the place does not match the event condition, when the current time reaches "start time," following control is performed. This control is performed to address an error of the location information acquiring section 30A. In this case, the TPO definition managing means 31*a* activates the TPO utility. Alternatively, when the TPO definition managing means 31*a* detects access to limited data or application, the TPO utility may be activated.

In this case, the TPO utility of the TPO definition managing means 31*a* displays an alert screen for checking whether or not the user selects transition to the main event state. The alert screen displays a message "Transition is notified to the administrator." When the user selects transition to the main event state on the alert screen, the TPO utility displays an authentication dialog for authenticating the user of the portable terminal 30. When user authentication is completed, the TPO definition managing means 31*a* notifies transition to the main event state to the administrator (client terminal CT of the administrator), and shifts to main event setting.

(a3) Second Specified Transition

In the case where the place matches the event condition, and the TPO definition managing means 31*a* detects access to limited data or application while the current time is "a predetermined time earlier (for example, 30 minutes earlier) than the start time," the same control as in (a2) is performed. This control is performed to address data confirmation and rehearsal at the last minute.

(a4) Special Transition

In the case where the place does not match the event condition, and the current time reaches "a predetermined time earlier (for example, 30 minutes earlier) than the start time," special transition can be designated. The special transition is performed in the case where transition to the main event state (here, "visit to customer" state) is needed for any reason other than application.

In this case, special transition is designated by using the TPO utility. This transition requires application and approval of special transition. With the TPO utility, the user inputs a reason for special transition and user authentication information of the portable terminal 30 to apply special transition. In this case, the TPO definition managing means 31*a* notifies the application to the administrator (client terminal CT of the administrator). When the administrator approves the application, the TPO definition managing means 31*a* shifts to the main event setting.

Approval of the administrator may be replaced by getting a special transition password that is previously prepared for each event and managed by the administrator from the administrator, and inputting the password into the portable terminal 30. To this end, the special transition password is kept in the TPO definition managing means 31*a*. In the case where the inputted password matches the special transition password, the TPO definition managing means 31*a* shifts to the main event setting. Even when the portable terminal 30 cannot establish communication, approval can be made through the special transition extension password to transition to main event setting.

(a5) One-Time Access

In the case where the place does not match the event condition, and the current time reaches a predetermined time earlier (for example, 30 minutes earlier) than the start time, one-time access can be designated. One-time access is performed in the case where the user needs to check contents in advance at business trip or visit to a plurality of customers. That is, a single "visit to customer" event is invalidated, "visit to customer" events to a plurality of customers during a predetermined period, referred to as "making the rounds" is validated when applied and approved.

In this case, one-time access is designated by using the TPO utility. To validate the designation, predetermined control (for example, control in (a2) or (a4)) is performed. Setting of validation control may differ according to customer, presence or absence of NDA, information importance, which are set in the TPO requirement. During one-time access, the portable terminal 30 may be set to record sound or images.

(b) "Out" Transition from Main Event

This control is performed to address the early-finished or extended main event. Extension of the main event has higher priority than default and setting based on the approved TPO requirement. The extension may be handled as a change in termination time of the main event.

(b1) First Transition Extension

In the case where the current time reaches a predetermined time earlier (for example, five minutes, three minutes, one minute earlier) than the finish time (in the case of extension, extended finish time), the TPO utility of the TPO definition managing means 31*a* displays an alert screen for checking whether or not the current event mode is extended after termination of the main event state due to term termination. The alert screen displays messages "Visit to customer mode is terminated after predetermined time," "To extend visit to customer mode, press extension button," and "Extension of visit to customer mode is notified to administrator." Pressing of the extension button can request extension of a predetermined time (for example, 15 minutes). The term "visit to customer" in the messages may be the content of "event type" in the TPO requirement data 240.

When the TPO definition managing means 31*a* detects use of the extension button, the TPO utility of the TPO definition managing means 31*a* displays the authentication dialog for authenticating the user of the portable terminal 30.

When user authentication is completed, the TPO definition managing means 31a performs transition extension. During extension, portable terminal 30 may be set to record sound and images. In this case, the sound and images are recorded into files by use of a microphone and a camera of the portable terminal 30.

The number of times of extension may be limited (for example, up to three times). In this case, data on the maximum number of times is kept in the TPO definition managing means 31a. The TPO definition managing means 31a counts the number of times of extension, and rejects extension when the count reaches the maximum number of times.

(b2) Second Transition Extension

When the current time reaches the finish time (in the case of extension, extended finish time), the user can designate special transition extension by using the TPO utility. The user designates special transition extension to the main event state (here, "visit to customer" state) by using the TPO utility. This transition requires application and approval of special transition extension. The user inputs a reason for special transition extension and user authentication information of the portable terminal 30 by use of the TPO utility to apply extension. In this case, the TPO definition managing means 31a notifies this application to the administrator (client terminal CT of the administrator). Then, when the administrator approves the application, the TPO definition managing means 31a shifts to main event setting.

Approval of the administrator may be replaced by getting a special transition extension password that is previously prepared for each event and managed by the administrator from the administrator, and inputting the password into the portable terminal 30. To this end, the special transition password is kept in the TPO definition managing means 31a. In the case where the inputted password matches the special transition extension password, the TPO definition managing means 31a maintains to the main event setting. Even when the portable terminal 30 cannot establish communication, approval can be made through the special transition extension password to maintain main event setting.

(b3) Third Transition Extension

In the case where the place changes from a place that matches the event condition to a place that does not match the event condition, and time is before the finish time (in the case of extension, extended finish time), following control is performed. This control is performed to address the case where the place moves during the main event, or the location information acquiring section 30A has an error.

After termination of the main event state due to movement, the TPO utility of the TPO definition managing means 31a displays an alert screen for checking whether or not the current event mode continues. The alert screen displays messages "termination of main event due to locational movement," "Press continuation button to continue visit to customer mode," and "Notify continuation of visit to customer mode to administrator. The term "visit to customer" in the messages may be the content of "event type" in the TPO requirement data 240.

When the TPO definition managing means 31a selects the continuation button, the TPO utility of the TPO definition managing means 31a displays the authentication dialog for authenticating the user of the portable terminal 30.

When the user authentication is completed, the TPO definition managing means 31a continues the main event. In the case where alert is ignored, the TPO definition managing means 31a shifts from the main event to the subsequent related event after an elapse of a predetermined time (for example, one minute).

(b4) Normal Transition

When the current time reaches the finish time (in the case of extension, extended finish time), TPO definition managing means 31a shifts from the main event to the subsequent related event.

(b5) One-Time Access

In the case where the place does not match the event condition, when the current time is after the "finish time (in the case of extension, extended finish time)," following control is performed. This control is performed to address data reconfirmation in response to the inquiry of the customer after the main event.

In this case, one-time access is designated by using the TPO utility screen. To validate the designation, predetermined control (for example, control in (b2) or (b3)) is performed.

Setting of validation control may differ according to the customer, presence or absence of NDA, the information importance, which are set in the TPO requirement. During one-time access, the portable terminal 30 may be set to record sound or images.

This embodiment achieves following advantages.

(1) In the embodiment, the control section 11 of the CRM server 10 executes TPO requirement editing processing (Step S11). Next, the control section 21 of the TPO server 20 executes conversion processing into the TPO definition (Step S22). Then, the control section 21 of the TPO server 20 executes TPO definition setting processing (Step S23). Thereby, since the TPO definition for security management of the portable terminal 30 is set according to schedule registered in the CRM server 10, in even the portable terminal 30 taken to the outside, efficient and proper information management can be performed.

(2) In the embodiment, the portable terminal 30 executes the current location identification processing (Step S31) and the current time identification processing (Step S32). Then, the control section 31 of the portable terminal 30 executes the state change monitoring processing (Step S33) and the TPO definition state transition check processing (Step S34). In the case where a change in the TPO definition state is detected, the control section 31 of the portable terminal 30 executes the TPO definition state transition notification processing (Step S35). Then, the control section 31 of the portable terminal 30 executes individual control processing (Step S41). Thus, since operational control is changed according to the current location and the current time of the portable terminal 30, proper security management can be made according to the state of the portable terminal 30.

(3) In the embodiment, the secure set storage section 22 records the secure set data 220 for generating the TPO definition from the TPO requirement therein. The templates for generating the TPO definition from the TPO requirement are recorded in the secure set data 220. Use of the template corresponding to the event type enables efficient setting corresponding to the event type.

(4) In the embodiment, for the event type "default", the setting of in-house differs between "in-house LAN connection" at normal time and "in-house LAN disconnection" due to network failure, and the setting of outside differs between "not permitted to be brought out" and "permitted to be brought out." Thus, even when no event is registered, security management can be performed based on default setting according to situations.

(5) In the embodiment, in the secure set of the event type "meeting", the setting differs between "department the user belongs to" and "department the user does not belongs to" (pre-event, during meeting, default)". Thus, even in the meeting across a plurality of departments, security management can be performed according to situations including, security management in consideration of situations before and after the meeting.

(6) In the embodiment, in the secure set of the event type "visit to customer," the setting differs among "in-house", "in transit", "during visit", and "during return". In the secure set of the event type "business trip", setting differs among "in-house", "in transit", "during visit", and "during return". Thus, even outside the office, such as the customer site, security management can be performed according to situations. Moreover, security management in consideration of situations before leaving the office and on the way back from the outside.

(7) In the embodiment, the secure set of the event type "satellite office", the event type "resident in customer site", and the event type "work-at-home" is registered. As a result, in response to various working styles, proper security management can be performed.

The embodiment may be modified as follows.

In the embodiment, the control section 21 of the TPO server 20 executes conversion processing into the TPO definition (Step S22). In this case, the TPO definition is generated based on the TPO requirement corresponding to the approved schedule application. At this time, a plurality of schedules may be combined to generate the TPO definition. In this case, schedules of different event types occur consecutively, or a plurality of schedules may overlap. In the case where the schedules occur consecutively, the secure set data 220 recorded in the secure set storage section 22 is made successive to create the TPO definition.

While two or more events overlap, the same information or the same device may have different security settings. Thus, following operational control information is applied.

(a) In control of information in the file managing means 311 and the cache managing means 312, in the case where the same information has different security setting, setting of the least limited operation is applied to the information.

(b) In control of device setting in the application managing means 313, the communication managing means 314, and the lock managing means 315, in the case where the same information has different security setting, setting of the least limited operation is applied to each of the setting items.

Priority of the event type may be set. In this case, while two or more events overlap, operational control is performed according to the TPO definition corresponding to the priority.

In the case where a plurality of schedules are registered for a predetermined period (for example, one day), setting of the preceding events and the subsequent events of the main events in the schedules may be changed. In this case, the subsequent event and the preceding event are set so as to fill a period between two main events in the predetermined period. Thereby, even when the user visits a plurality of customer sites in one going-out, preparation and post-processing for each visit site can be made between the preceding visit site and the subsequent visit site.

In the embodiment, an event before the main event (preceding event) and an event after the main event (subsequent event) are set as related events. At this time, the events may be expanded to a plurality of hierarchies. For example, visit to customer is configured of events of the plurality of hierarchies including the base event "going-out" (lower hierarchy event) and the event "visit" existing in going-out (higher hierarchy event). In this case, the secure set storage section 22 stores hierarchy information for distinguishing between the lower hierarchy event and the higher hierarchy event for each event type. The hierarchy may be identified based on schedule inclusion relation (longer event is defined as lower hierarchy). Further, in the secure set storage section 22, a method of modifying operational control information of one event based on operational control information of another event is recorded.

For example, when the user visits a plurality of customer sites in one going-out, a period of the going-out event and a period of the event of each customer site are set in the schedule. When detecting the higher hierarchy event (visit to each customer site) in the period of the lower hierarchy event (here, "going-out"), the control section 21 of the TPO server 20 modifies operational control information of the lower hierarchy event based on the higher hierarchy event. For example, operational control information is modified so as to allow operation of the preceding event and the subsequent event of the higher hierarchy event (main event) also in the period of the lower hierarchy event by using the modification method recorded in the secure set storage section 22. As the modification method, a proper description method such as function type, procedure type, or predicate logic type can be adopted according to situations.

In the function type, functional description using a TPO value of another affected event as a parameter is used.

In the procedure type, condition setting identifying interaction in an "if-then" format and definition of the related event at this time are used. The type and number of the related event may be changed according to condition. Definition may be described according to the function type.

In the predicate logic type, rules are described in non-procedural programming language such as "Prolog".

Thus, in the period of the lower hierarchy event, preparation and post-processing of a plurality of higher hierarchy events (main events) occurring in the same period can be performed.

Operational control information of the higher hierarchy event may be modified based on operational control information of the lower hierarchy event. The number of hierarchies is not limited to two, but may be three or more. In any case, a method of modifying operational control information of an event group including a plurality of interrelated event types is recorded in the secure set storage section 22. Here, the affecting event type (one or some of the events) in the event group, the affected event type (the other events) in the event group, and a method of modifying operational control information of the event are recorded in the secure set storage section 22. In this case, as described above, function type, procedure type, or predicate logic type may be adopted as the modification method.

The correlation between a plurality of interrelated events may be set. For example, operational control information of two visits to customers in a predetermined period is modified according to the relationship of the customer sites. In this case, for the interrelated event types, the content (method of modifying operational control information) of effect on the other event is recorded in the secure set data 220 of the secure set storage section 22. When detecting the plurality of interrelated event types in the predetermined period, the control section 21 of the TPO server 20 modifies operational control information of each event by using the modification method recorded in the secure set data 220.

In the embodiment, the TPO server 20, the portable terminal 30, and the file server 40 are controlled according to the TPO definition. However, controlled targets are not limited to these. For example, only the portable terminal 30 may be controlled, or other servers accessed by the portable terminal 30 may be controlled.

In the embodiment, the TPO definition is set in the TPO server 20, portable terminal 30, and file server 40. Here, the TPO server 20 may monitor the state of each portable terminal 30 and operate each portable terminal 30. In this case, the control section 21 of the TPO server 20 is provided with a terminal monitoring means for monitoring the state of security setting of each portable terminal 30 and operating each portable terminal 30. A portable terminal managing means acquires the current location and the state of each portable terminal 30, information on the log managing means 31c, and information on the state of security setting as needed to monitor each portable terminal 30. The portable terminal managing means further compares the TPO definition of each portable terminal 30, which is recorded in the TPO definition storage section 25, with various types of information acquired from the portable terminal 30. In any suspicious case, for example, in the case where the TPO definition of the portable terminal 30 is different from the current state, the portable terminal managing means outputs alert information. Then, based on monitoring information and alert information, the portable terminal managing means performs cache clearing and state transition in the portable terminal 30. Alternatively, when receiving a request from the administrator of the portable terminal 30, the portable terminal managing means may perform such operation as cache clearing and state transition.

The control section 31 of each portable terminal 30 is further provided with a state transition notification means for detecting TPO definition state transition and notifying the setting state to the TPO server 20 when security setting is changed.

When receiving notification of state transition from the portable terminal 30, the TPO server 20 deletes the TPO definition state recorded in the TPO definition storage section. In the case where the portable terminal 30 does not receive notification of state transition even when time recorded in the TPO definition storage section has passed, the portable terminal 30 is to be monitored. The current location and the setting state of the monitored portable terminal 30 are periodically acquired. Information on the monitored portable terminal 30 is offered to the administrator. Thereby, attention to the portable terminal 30 in the state that is different from planned schedule can be drawn to the administrator.

In the embodiment, the control section 31 of the portable terminal 30 executes the state change monitoring processing (Step S33) and the TPO definition state transition check processing (Step S34). That is, by using time and place as conditions, the setting for security management is changed. In addition, based on the operation of the portable terminal 30, the setting for security management may be changed. For example, the TPO definition corresponding to the case where the operation of closing a file in the portable terminal 30 is performed is set. Further, an emergency password for return to original security setting in the case of a change in security setting is set. Thereby, the security setting can be changed according to the user operational state.

In the embodiment, various files are stored in the cache 33 of the portable terminal 30. Alternatively, files used in application may be stored in the application. In this case, since the files are present in the application, a file management API for performing deletion of the files in the application and authority management is provided. The file management API manages access to the files and deletes the files according to the TPO definition. Thereby, the security of the files stored in the application can be ensured.

Figure 11:
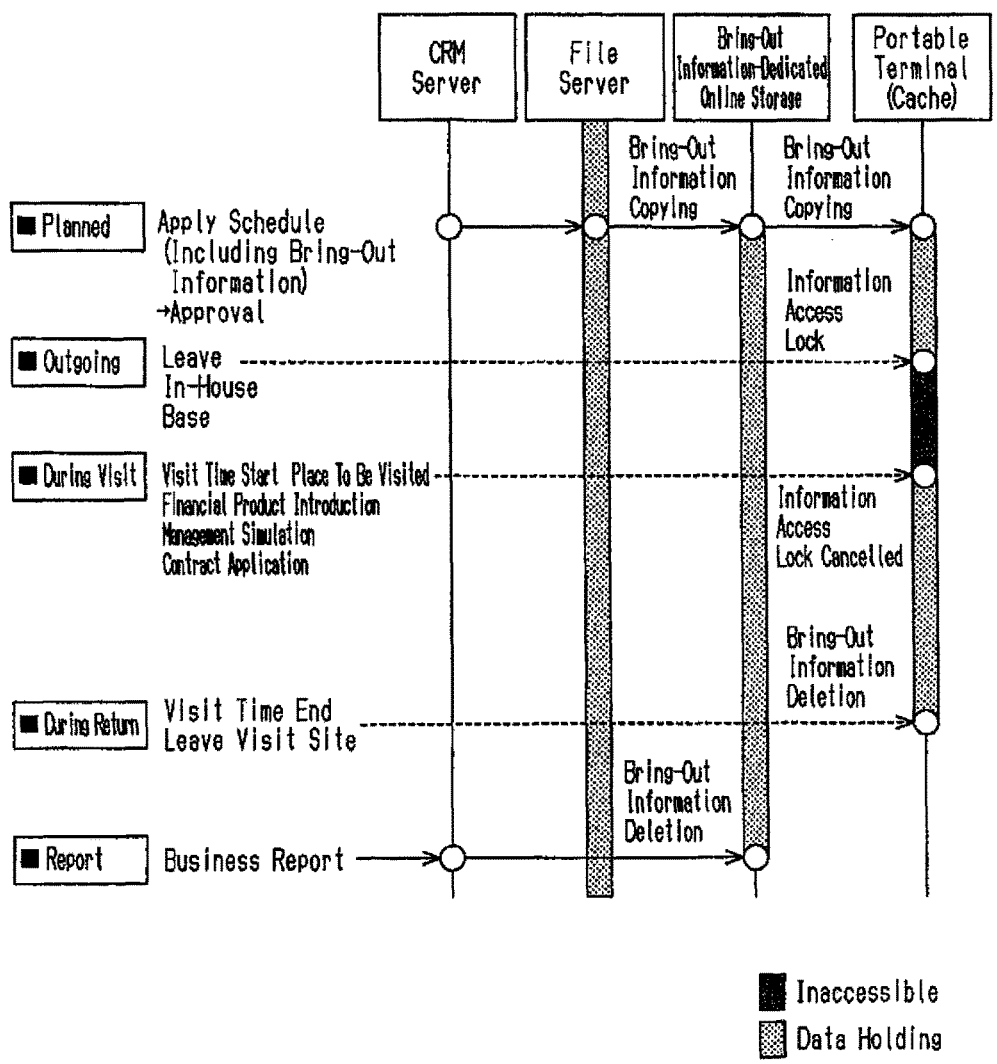
FIG. 11 is an explanatory diagram illustrating processing in each stage of visit to customer in another embodiment.
Figure 12:
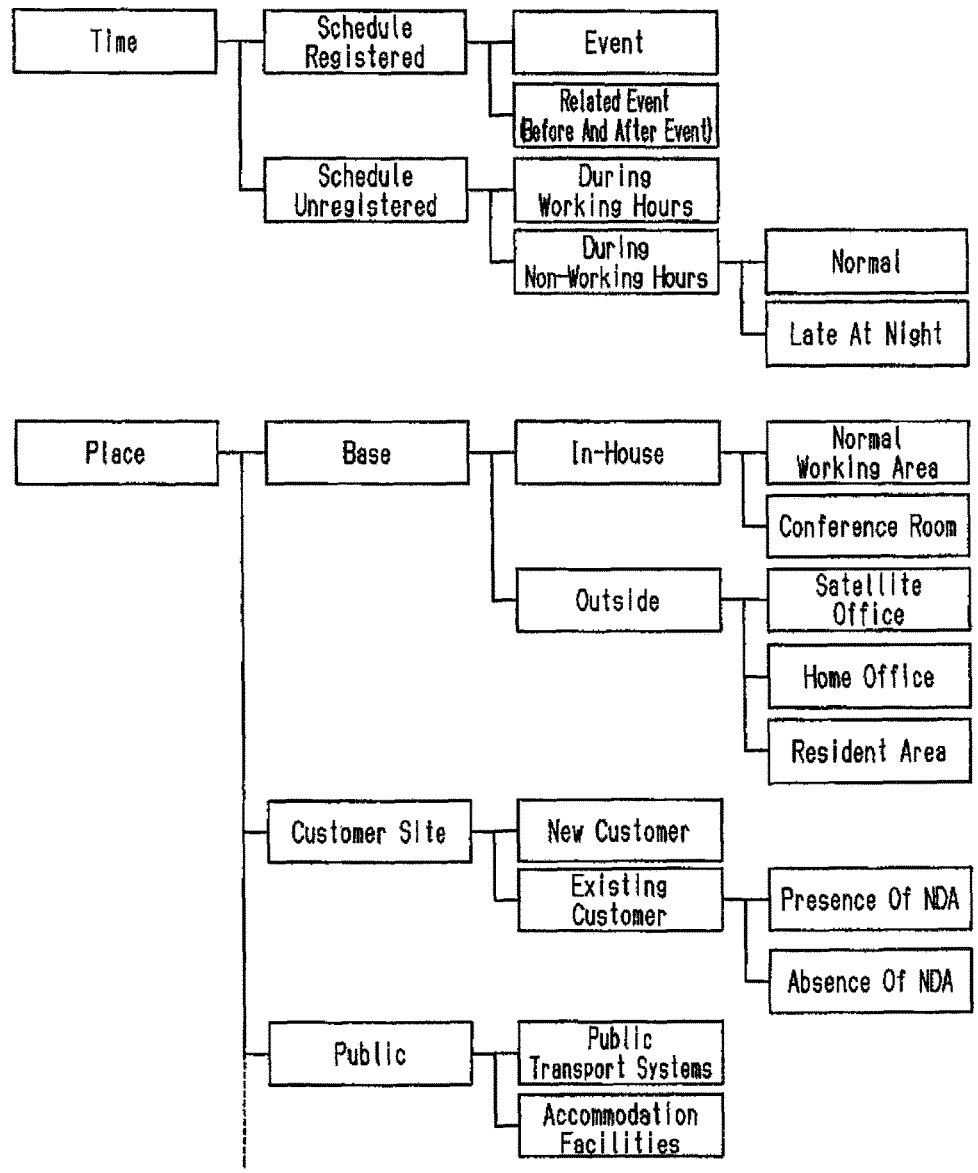
FIG. 12 is an explanatory diagram illustrating place and time elements to be considered in information management.

In the embodiment, files acquired from the file server 40 are stored in the cache 33 of the portable terminal 30. Here, an intermediate hierarchy may be provided between the file server 40 and the portable terminal 30. In this case, as shown in FIG. 11, a bring-out information dedicated online storage is provided between the file server 40 and the portable terminal 30. The file server 40 stores bring-out information in the bring-out information-dedicated online storage according to the TPO requirement. Then, the portable terminal 30 acquires bring-out information from the bring-out information-dedicated online storage. At return, bring-out information stored in the cache 33 of the portable terminal 30 is deleted. In this case, by leaving bring-out information in the bring-out information-dedicated online storage, access to the bring-out information-dedicated online storage enables check of bring-out information. Then, when a business report is registered in the report stage, bring-out information in the bring-out information-dedicated online storage is deleted. In this manner, the file server 40 to portable terminal 30 can be hierarchized to achieve information management according to security level corresponding to hierarchy.

In the embodiment, when the current state matches the event condition of the TPO definition, the operation of the portable terminal 30 is controlled based on operational control information corresponding to the event condition. Even in the case where some elements (time, place) of the condition do not match, the operation may be controlled based on operational control information corresponding to the event condition. In this case, even in the case where any of elements of the event condition in the TPO definition does not match the event condition, when the difference between the element and the event condition falls within a predetermined allowable range, it is assumed that the event condition is satisfied, and the operation is managed by the security checking processing. For example, when the current location is within a reference distance from event place, or the current time is within a predetermined allowable range of event time, the operation is controlled based on operational control information of the event. In this case, a difference allowable range is set in the TPO definition.

In this case, the security checking processing may be changed depending on the security level of bring-out information. For example, for the secret files, an inquiry about a password preset for the secret files is referred to the administrator. The secret files become available through this password. The general files become available through user authentication information (password authentication or biometric authentication) previously registered in the portable terminal 30. Proper information management can be performed by using such access method based on the security level.

In the embodiment, the file managing means 311 manages setting processing of the access authority to the file server 40 based on the TPO definition. Here, the file managing means 311 may also manage files in the file server 40 and the portable terminal 30 via the TPO server 20. In this case, the TPO definition is set in the TPO server 20 and the portable terminal 30. The TPO server 20 is set to control a relay between the portable terminal 30 and the file server 40. Then the portable terminal 30 accesses the file stored in the file server 40 via the TPO server 20. Accordingly, the security management of the invention can achieve in the file server 40 without setting the TPO definition.

In the embodiment, the event type "meeting" is set as an example of the secure set. The security setting may be changed according to the meeting type. For example, when important information is handled as in a management meeting, the cache should be completely cleared after the meeting. In this case, the event type "management meeting" is prepared as the secure set, and setting information for deleting all files in the related event "post-meeting (after meeting)" is recorded. This can absolutely ensure the management of important information. By using the secure set as described above, setting can be changed or added according to security requirement.

In the embodiment, schedule information such as event period and event place is managed in the CRM server 10. Information used for schedule management is not limited to information recorded in the CRM server 10. For example, the information may be replaced with event period information in a calendar application or event place information in an address book application. In this case, the control section 21 of the TPO server 20 acquires event period information on an event from the calendar application. The control section 21 further acquires event place information on the event from the address book application by using the name of the event place and the like. Moreover, the place definition storage section 23 of the TPO server 20 is kept by the CRM server 10 or the address book application.

DESCRIPTION OF THE REFERENCE NUMERALS

CT: client terminal, 10: CRM server, 11: control section, 111: TPO requirement editing means, 20: TPO server, 21: control section, 211: TPO requirement registering means, 212: TPO definition setting means, 22: secure set storage section, 23: place definition storage section, 24: TPO requirement storage section, 25: TPO definition storage section, 30: portable terminal, 30A: location information acquiring section, 30B: timer, 31: control section, 31*a*: TPO definition managing means, 31*b*: secure managing means, 31*c*: log managing means, 311: file managing means, 312: cache managing means, 313: application managing means, 314: communication managing means, 315: lock managing means, 316: deleting means, 32: TPO definition storage section, 33: cache, 40: file server.

The invention claimed is:

1. A system comprising:
a storage means configured to register an event definition template containing operational control information for controlling an operation of controlled equipment for a schedule-registered event type; and
an event managing means configured to perform setting for controlling the operation of the controlled equipment, wherein
the event managing means
acquires an event requirement defined by an event place, an event period, and an event participant for the schedule-registered event type,
identifies an event definition template corresponding to the schedule-registered event type in the storage means, and
generates an event definition for controlling a controlled equipment used by the event participant in the event place and the event period,
wherein the event definition is based on operational control information in the identified event definition template.

2. The system according to claim 1, wherein security area operational control information associated with information for identifying security-ensured place and non-security area operational control information associated with information for identifying security-unensured place are initially set in the controlled equipment.

3. The system according to claim 1, wherein operational control information on the event place and a period related to the event period for the schedule-registered event type is set in the event definition template.

4. The system according to claim 1, wherein in the case where an event group consisting of a plurality of predetermined correlated events occurring in a certain period is identified, based on operational control information of one or some of the events in the event group, the event managing means modifies operational control information of other events in the event group.

5. A system comprising:
a storage means configured to register an event definition template containing operational control information for controlling an operation of controlled equipment for a schedule-registered event type; and
an event managing means configured to perform setting for controlling the operation of the controlled equipment, wherein
the event managing means
acquires an event requirement defined by an event place, an event period, and an event participant for the schedule-registered event type,
identifies an event definition template corresponding to the schedule-registered event type in the storage means,
identifies the controlled equipment used by the event participant corresponding to the event requirement, and
sets an event definition to the controlled equipment for an event condition including the event place and the event period as elements,
wherein the event definition is based on the operational control information in the identified event definition template.

6. A system comprising:
a controlled equipment,
a storage means configured to register an event definition template containing operational control information for controlling an operation of the controlled equipment for a schedule-registered event type; and
an event managing means configured to perform setting for controlling the operation of the controlled equipment, wherein
the controlled equipment used by an event participant corresponding to an event requirement defined by an event place, an event period, and the event participant for the schedule-registered event type,
identifies a current state including current location and current date and time,
compares the current state with an event definition based on the operational control information in an event definition template corresponding to an event type in the storage means for an event condition including the event place and the event period as elements, and
controls the operation of the controlled equipment based on the operational control information according to a comparison result.

7. The system according to claim 6, wherein
in the case where a mismatch is partially present in the comparison result of the current state and the event condition, the controlled equipment executes security checking processing for checking content of the mismatch, and in the case where it is determined that the content of the mismatch has no problem in the security checking processing, the operation of the controlled equipment is controlled based on operational control information applied in the case where no mismatch is present in the comparison result.

8. The system according to claim 7, wherein in the case where the content of the mismatch falls within a predetermined allowable range, the security checking processing is executed.

9. The system according to claim 6, wherein the controlled equipment is connected to a file server that stores a file used in the event via a network, the event requirement includes a file identifier of the file used in the event, file access authority in the event requirement is set in the operational control information, the controlled equipment before the event period, acquires the file having the file identifier included in the event requirement from the file server, and stores the file in a temporary storage means in the controlled equipment, and according to the comparison result, allows access to the file stored in the temporary storage means based on the access authority set in the operational control information.

10. The system according claim 9, wherein the temporary storage means of the controlled equipment is provided with a folder corresponding to access authority, and the controlled equipment stores the file used in the event in the folder corresponding to access authority set in the event requirement, and allows access to the folder based on access authority set in the operational control information.

11. The system according claim 9, wherein when detecting leaving from the event place or termination of the event period according to the comparison result, the controlled equipment deletes the file stored in the temporary storage means.

12. The system according to claim 6, wherein the operational control information includes an application identifier of an application, and the controlled equipment controls the operation of the application having the application identifier included in the operational control information according to the comparison result.

13. The system according to claim 6, wherein the operational control information includes a waiting time taken to activate a security lock of the controlled equipment, and the controlled equipment activates the security lock based on the waiting time included in the operational control information according to the comparison result.

* * * * *